(12) United States Patent
Wellinghoff et al.

(10) Patent No.: US 7,041,234 B2
(45) Date of Patent: May 9, 2006

(54) METHODS FOR SYNTHESIS OF LIQUID CRYSTALS

(75) Inventors: Stephen T. Wellinghoff, San Antonio, TX (US); Douglas P. Hanson, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 322 days.

(21) Appl. No.: 10/057,548

(22) Filed: Jan. 23, 2002

(65) Prior Publication Data

US 2003/0055280 A1 Mar. 20, 2003

Related U.S. Application Data

(60) Provisional application No. 60/263,387, filed on Jan. 23, 2001, provisional application No. 60/263,392, filed on Jan. 23, 2001, and provisional application No. 60/263,388, filed on Jan. 23, 2001.

(51) Int. Cl.
C09K 19/20 (2006.01)

(52) U.S. Cl. ............................ 252/299.67; 252/299.64; 585/25; 585/935

(58) Field of Classification Search ............ 252/299.01, 252/299.64, 299.67; 522/1; 523/105, 109, 523/113, 120; 359/99, 102; 585/16, 24, 25, 585/935
See application file for complete search history.

(56) References Cited

U.S. PATENT DOCUMENTS

| | | | |
|---|---|---|---|
| 4,201,856 A | 5/1980 | Jackson, Jr. et al. | |
| 4,914,221 A | 4/1990 | Winkler et al. | |
| 5,024,850 A | 6/1991 | Broer et al. | |
| 5,073,294 A | 12/1991 | Shannon et al. | |
| 5,202,053 A | 4/1993 | Shannon | |
| 5,563,230 A | 10/1996 | Hsu et al. | |
| 5,624,976 A | 4/1997 | Klee | |
| 5,654,471 A | 8/1997 | Zahn et al. | |
| 5,808,108 A | 9/1998 | Chappelow et al. | |
| 5,833,880 A | 11/1998 | Siemensmeyer et al. | |
| 5,871,865 A | 2/1999 | Barker et al. | |
| 5,989,461 A | 11/1999 | Coates et al. | |
| 6,060,042 A | 5/2000 | Schuhmacher et al. | |
| 6,090,308 A | 7/2000 | Coates et al. | |
| 6,117,920 A * | 9/2000 | Jolliffe et al. ................ | 522/170 |
| 6,136,225 A | 10/2000 | Meyer et al. | |
| 6,144,428 A * | 11/2000 | Schadt et al. ................ | 349/113 |
| 6,194,481 B1 | 2/2001 | Furman et al. | |
| 6,204,302 B1 | 3/2001 | Rawls et al. | |
| 6,217,792 B1 | 4/2001 | Parri et al. | |
| 6,217,955 B1 | 4/2001 | Coates et al. | |
| 6,258,974 B1 | 7/2001 | Wellinghoff et al. | |
| 6,291,035 B1 | 9/2001 | Verrall et al. | |
| 6,303,050 B1 | 10/2001 | Dannenhauer et al. | |
| 6,410,765 B1 | 6/2002 | Wellinghoff et al. | |
| 6,414,092 B1 | 7/2002 | Coates et al. | |
| 6,417,244 B1 | 7/2002 | Wellinghoff et al. | |
| 6,649,230 B1 * | 11/2003 | Seiberle et al. ............. | 428/1.2 |
| 6,696,585 B1 | 2/2004 | Wellinghoff et al. | |
| 6,699,405 B1 | 3/2004 | Prechtl et al. | |
| 6,743,936 B1 | 6/2004 | Wellinghoff et al. | |
| 2002/0013382 A1 | 1/2002 | Furman | |
| 2002/0036285 A1 | 3/2002 | Prechtl et al. | |
| 2002/0177727 A1 | 11/2002 | Wellinghoff | |
| 2003/0036609 A1 | 2/2003 | Wellinghoff | |
| 2003/0055280 A1 | 3/2003 | Wellinhoff | |
| 2003/0125435 A1 | 7/2003 | Norling | |
| 2003/0168833 A1 | 9/2003 | Wellinghoff | |
| 2004/0144954 A1 | 7/2004 | Wellinghoff | |
| 2004/0199004 A1 | 10/2004 | Wellinghoff et al. | |

FOREIGN PATENT DOCUMENTS

| | | |
|---|---|---|
| EP | 0159887 A2 | 10/1985 |
| EP | 0 242 278 A2 | 10/1987 |
| EP | 0722992 A1 | 7/1996 |
| EP | 0 869 112 A1 | 3/1998 |
| GB | 2 297 549 A | 7/1996 |
| WO | WO 79/01040 | 11/1979 |
| WO | WO 92/16183 | 10/1992 |
| WO | WO 93/22397 | 11/1993 |
| WO | WO 94/16129 | 7/1994 |
| WO | WO 02/070543 A2 | 9/2002 |

OTHER PUBLICATIONS

Schmidt, et al., New Liquid Crystalline di–and tetra– acrylates for network formation, Liquid Crystals, 2001, vol. 28, No. 11, 1611–1621.

Hellwig, Influence of an incremental application technique on the polymerization of two light–activated dental composite filling materials, Dtsch. Zahnaerzil Z., 1991, pp. 270–273, vol. 46.

Hutchins, Aqueous Polar Aprotic Solvents. Efficient Sources of Nucleophilic Oxygen, J. Org. Chem. 1983, pp. 1360–1362, vol. 48, The American Chemical Society.

Meek, Inertness of Tetrachlorofulvenes in the Diels–Alder Reaction, J. Org. Chem., Jan. 9, 1958, pp. 1708–1710, vol. 22 (12), The American Chemical Society.

(Continued)

*Primary Examiner*—Mark F. Huff
*Assistant Examiner*—Jennifer R. Sadula
(74) *Attorney, Agent, or Firm*—Paula D. Morris; The Morris Law Firm, P.C.

(57) ABSTRACT

A method for producing platform molecules comprising: forming a mixture comprising first and second phenylene rings comprising halogenated carboxylic groups, and a third phenylene ring comprising a desired substituent and a first functionality at a para-position to a second funcitonality; and exposing the mixture to conditions effective to react the first halogenated carboxylic group with the first functionality to produce a first ester bond, and the second halogenated carboxylic group with the second functionality to produce a second ester bond; producing platform molecules comprising terminal groups comprising the first functional group at a position para to first ester bond and the second functional group at a position para to the second ester bond.

51 Claims, No Drawings

OTHER PUBLICATIONS

Geng, Targeted Drug Release by a Novel Polymeric Device Based on EVA (Ethylene Vinyl Acetate) For Periodontal Condition, (ABSTRACT).

Wang, Rheological Properties of Dental Composites, (ABSTRACT).

Panyayong, Effects of Corn–Starched & Primer Additions on Mechanical Properties of Provisional Dental Resin, (ABSTRACT).

Choi, Rheological studies on sterically stabilized model dispersions of uniform colloidal spheres. II. Steady–shear viscosity, J. Colloid Interface Science., Sep. 1986, pp. 101–113, vol. 113(1), Academic Press, Inc.

Condon, Reduction of composite contraction stress through non–bonded microfiller particles, Dental Materials, Jul. 1998, pp. 256–260, vol. 14.

Hikmet, Anisotropic polymerization shrinkage behavior of liquid–crystalline diacrylates, Polymer, 1992, pp. 89–95, vol. 33(1), Butterworth–Heinemann Ltd.

Norling et al, Polymerizable nematic liquid crystal monomers for reduced shrinkage restorative resins, Proc. 17th Southern Biomed. Eng. Conf., 1998, p. 120.

Liu, Constant–volume polymerization of composites by addition of ammonia–modified montmorillonite, American Journal of Dentistry, Apr. 1990, pp. 44–50, vol. 3(2).

Millich, Elements of light–cured epoxy based dental polymer systems, J. Dent. Res., Apr. 1998, pp. 603–608, vol. 77(4).

Rawls, et al, Low Shrinkage resins from liquid crystal diacrylate monomers, ACS Polymer Preprints, Sep. 1997, pp. 167–168, vol. 38(2).

Stansbury et al, Cyclopolymerizable Monomers for use in dental resin composites, J. Dent. Res., Mar. 1990, pp. 844–848, vol. 69(3).

Uno et al, Marginal adaptation of a restorative resin polymerized at reduced rate, Scand. J. Dent. Res., 1991, pp. 440–444, vol. 99(5).

Holmberg, Ester Synthesis with Dicyclohexycarbodiimide Improved by Acid Catalysts, Acta Chemica Scandinavica, 1979, pp. 410–412, vol. B 33.

Nakamura, Characterization of Epitaxially Grown ZnS : Mn Films on a GaAs(100) Substrate prepared by the Hot–wall Epitaxy Technique, J. Mater. Chem., 1991, pp. 357–359, vol. 1(3).

Schultz, Polymerization and Viscoelastic Behavior of Networks from a Dual–Curing, Liquid Crystalline Monomer, J. Polym. Phys., 1999, pp. 1183–1190, vol. 37, John Wiley & Sons, Inc.

Griffin, Mesogenic Polymers. III. Thermal Properties and Synthesis of Three Homologous Series of Thermotropic Liquid Crystalline "Backbone" Polyesters, Journal of Polymer Science: Polymer Physics Edition, 1981, pp. 951–969, vol. 19, John Wiley & Sons, Inc.

Kornblum, Displacement of the Nitro Group of Substituted Nitrobenzenes—a Synthetically Useful Process, J. Org. Chem., 1976, pp. 1560–1564, vol. 41, The American Chemical Society.

Clark, X–Ray Scattering Study of Smectic Ordering in a Silica Aerogel, Physical Review Letters, Nov. 22, 1993, pp. 3505–3508, vol. 71, No. 21, The American Chemical Society.

Broer, In–Situ photopolymerization of oriented liquid–crystalline acrylates, 4 Influence of a lateral methyl substituent on monomer and oriented polymer network properties of a mesogenic diacrylate, Makromol. Chem. 1989, pp. 3201–3215, vol. 190, Huthig & Wepf Verlag Basel, Heidelberg, New York.

Barclay, Liquid Crystalline and Rigid–rod Networks, Prog. Polym. Sci., 1993, pp. 899–945, vol. 18(5), Pergamon Press Ltd.

Liquid Crystalline Polymers to Mining Applications, Encyclopedia of Polymer Science and Engineering, 1987, pp. 1–61, vol. 9, John Wiley & Sons, New York.

Suzuki et al, Preparation of poly(dimethylsiloxane) macromonomers by the initiator method: 2. Polymerization mechanism, Polymer, 1989, pp. 333–337, vol. 30(2), Butterworth.

Kochan et al, Solid Freeform Manufacturing—Assessments and Improvements at the Entire Process Chain, Proceedings of the Seventh International Conference on Rapid Prototyping, Mar. 31–Apr. 3, 1997, pp. 203–214, 94RA021.

Norling et al, Cure shrinkage of experimental LC monomer based composite resins, Abstract, American Association for Dental Research meeting, 2001, Chicago, IL.

Mogri et al, Thermomechanical of liquid crystalline monomer in dental composites, Abstract, American Association for Dental Research meeting, 2001, Chicago, IL.

Dowell et al, The Effect of Silanation on Polymerization and Dynamic Mechanical Behavior of a homogenous nanofilled resin, Abstract, American Association for Dental Research meeting, 2001, Chicago, IL.

Logan et al, Effect of Silanation on Mechanical Properties of Homogeneous Nanofilled resins, Abstract, American Association for Dental Research meeting, 2001, Chicago, IL.

Norling et al, Synthesis of a new low shrinkage liquid crystal monomer, Abstract, American Association for Dental Research meeting, 2000, Washington, D.C.

Furman et al, A Radiopaque Zirconia Microfiller for Translucent Composite Restoratives, Abstract, American Association for Dental Research meeting, 2000, Washington, D.C.

Boland et al, Cell Survival and Cytokine Expression by Dental Cells Treated with a Liquid Crystal Resin Monomer, J. Dent. Res., 2001, pp. 151 (Abstract 928), vol. 80.

Wellinghoff et al, Reduced Shrinkage dimethacrylate liquid crystal resins, J. Den. Res. 1997, pp. 279 (Abstract 2127), vol. 76.

Norling et al, Cure shrinkage of composite resins and an experimental LC monomer, J. Dent. Res., 1999, pp. 233 (Abstract 1020), vol. 78.

* cited by examiner

METHODS FOR SYNTHESIS OF LIQUID CRYSTALS

PRIORITY DATA

The present application claims the benefit of the following provisional applications, all filed Jan. 23, 2001: Ser. No. 60/263,387; Ser. No. 60/263,392; Ser. No. 60/263,388.

GOVERNMENT RIGHTS CLAUSE

The U.S. government has certain rights in this invention pursuant to grant number NIDCR 1 P01 DE11688.

FIELD OF THE INVENTION

The application relates to new, less costly methods for making novel platform molecules and polymerizable mesogens.

BACKGROUND OF THE INVENTION

Photocurable resins which are transparent or translucent, radioopaque, have good workability, and have good mechanical strength and stability are useful in medical, dental, adhesive, and stereolithographic applications.

Low polymerization shrinkage is an important property for such resins. In dental applications, the phrase "zero polymerization shrinkage" typically means that the stresses accumulated during curing do not debond the dentin-restorative interface or fracture the tooth or restorative, which can result in marginal leakage and microbial attack of the tooth. Low polymerization shrinkage also is important to achieve accurate reproduction of photolithographic imprints and in producing optical elements.

Another advantageous property for such resins is maintenance of a liquid crystalline state during processing. For comfort in dental applications, the resin should be curable at "room temperature," defined herein as typical ambient temperature up to body temperature. Preferred curing temperatures are from about 20° C. to about 37° C. Mesogens which have been found to polymerize in a relatively stable manner at such temperatures are bis 1,4 [4'-(6'-methacryloxyhexyloxy)benzoyloxy]t-butylphenylene mesogens and their structural derivatives. These mesogens have the following general structure:

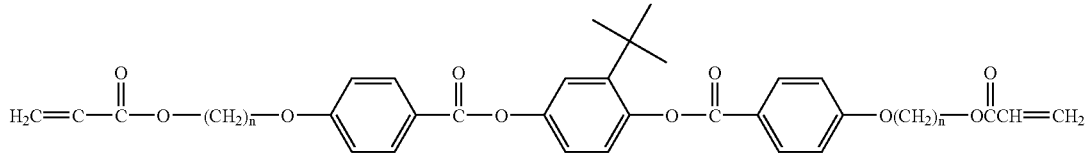

Unfortunately known synthetic methods for producing these mesogens are costly and have relatively low yields. As a result, the mesogens have enjoyed limited commercial use. Less costly synthetic methods are needed to produce the mesogens.

SUMMARY OF THE INVENTION

A method for producing platform molecules comprising:

providing a first phenylene ring comprising a first functional group at a para-position to a second functional group;

providing a second phenylene ring comprising a third functional group at a para-position to a fourth functional group;

providing a third phenylene ring comprising a desired substituent and comprising and a first functionality at a para-position to a second functionality; and reacting said first functional group with said first functionality, producing at least a first ester bond between said first phenylene ring and said third phenylene ring; and reacting said third functional group with said third functionality, producing at least a second ester bond between said second phenylene ring and said third phenylene ring, thereby producing platform molecules comprising a first terminal functionality at position para- to said first intervening ester bond and a second terminal functionality at a position para- to said second intervening ester bond, wherein at least one functionality selected from the group consisting of said first terminal functionality and said second terminal functionality is other than a polymerizable group;

wherein, when both said first terminal functionality and said second functionality are polymerizable groups, said desired substituent provides sufficient steric hindrance to achieve a nematic state at room temperature while suppressing crystallinity at room temperature.

DETAILED DESCRIPTION OF THE INVENTION

The application provides novel platform molecules, novel polymerizable mesogens, novel methods for using the platform molecules, and novel intermediates and synthetic pathways for making the platform molecules and polymerizable mesogens.

The Mesogens

The mesogens of the present application have the following general structure:

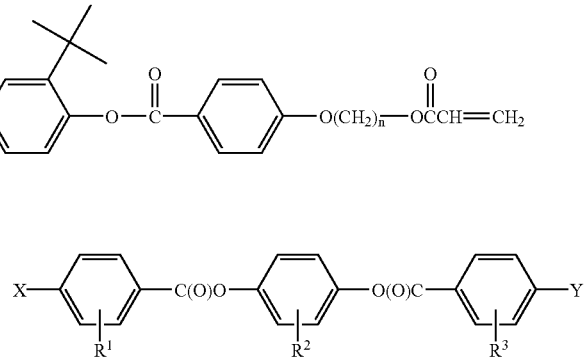

wherein X and Y are selected from the group consisting of terminal functionalities and polymerizable groups. In platform molecules, X and Y are terminal functionalities. In polymerizable mesogens, X and Y are polymerizable groups. Terminal functionalities and polymerizable groups are further defined below; and, R² is a desired substituent, preferably a "bulky organic group," defined herein as an organic group having a bulk greater than R₁ and R₃, whereby, when both X and Y are polymerizable groups, said bulk is adapted to provide sufficient steric hindrance to achieve a nematic state at room temperature while suppressing crystallinity at room temperature. The result is effective rheology and workability at room temperature. Suitable R² groups generate asymmetry in the packing of the molecules, and include, but are not necessarily limited to alkyl groups having from about 1 to 6 carbon atoms and aryl groups. Preferred R² groups include, but are not necessarily limited to alkyl groups having from about 1 to about 4 carbon atoms and phenyl groups. More preferred R² groups are methyl groups, t-butyl groups, isopropyl groups, secondary butyl groups, and phenyl groups. Most preferred R² groups are methyl groups and t-butyl groups; and R¹ and R³ are selected from groups less bulky than R², preferably selected from the group consisting of hydrogen atoms and methyl groups, depending upon the relative bulk of R¹, R³ and R².

As used herein, the phrase "terminal functionalities" refers to X and Y where the referenced molecules are platform molecules. "Terminal functionalities" are defined as protective groups and precursors to polymerizable groups, which generally comprise functionalities that readily react with "polymerizable groups" to form reactive ends. Suitable terminal functionalities independently are selected from the group consisting of hydroxyl groups, amino groups, sulfhydryl groups, halogen atoms, and "spacer groups", defined herein as selected from the group consisting of H—(CH₂)ₙ—O— groups, Cl(CH₂)ₙ—O— groups, Br(CH₂)ₙ—O— groups, I(CH₂)ₙ—O—-, wherein n is from about 2 to about 12, preferably from about 2 to about 9, more preferably from about 2 to about 6, and most preferably 6, and the CH₂ groups independently can be substituted by oxygen, sulfur, or an ester group; provided that at least 2 carbon atoms separate said oxygen or said ester group. Most preferred terminal functionalities are hydroxyl groups.

Where the mesogen is a polymerizable mesogen, X and/or Y are "polymerizable groups," defined as groups that may be polymerized by nucleophilic addition, free radical polymerization, or a combination thereof. Preferred polymerizable groups are polymerizable by Michael addition. Michael addition requires the addition of a nucleophile and an electron deficient alkene. Groups suitable for polymerization by Michael addition include but are not necessarily limited to the examples found in A. Michael, *J Prakt. Chem.* [2] 35, 349 (1887); R. Connor and W. R. McClelland, *J. Org Chem.*, 3, 570 (1938); and C. R. Hauser, M. T. Tetenbaum, *J. Org. Chem.*, 23, 1146 (1959), all of which are incorporated by reference herein.

Examples of suitable polymerizable groups include, but are not necessarily limited to substituted and unsubstituted alkenyl ester groups comprising a polymerizable unsaturated carbon-carbon bond, wherein said alkenyl group has from about 2 to about 12 carbon atoms, preferably from about 2 to about 9 carbon atoms, more preferably from about 2 to about 6 carbon atoms. In one embodiment, said substituted alkenyl ester groups comprise at least one halogen atom selected from the group consisting of chorine atoms, bromine atoms, and iodine atoms. Preferred alkenyl esters are acryloyloxy groups, methacryloyloxy groups, acryloyloxy alkoxy groups and methacryloyloxy alkoxy groups. More preferred polymerizable groups include, but are not necessarily limited to cinnamoyloxy groups, acryloyloxy groups, methacryloyloxy groups comprising an alkyl moiety having from about 2 to about 12 carbon atoms, thiolalkyloxy groups comprising an alkyl moiety having from about 2 to about 12 carbon atoms, preferably from about 2 to about 9, more preferably from about 2 to about 6, and most preferably 6 carbon atoms. Because assymetry suppresses crystallinity while maintaining a nematic state, it is preferred for X and Y to be different groups.

Most preferred polymerizable mesogens are bis 1,4 [4'-(6'-(R,R⁴)-oxy-A-oxy)benzoyloxy]R²-phenylene mesogens. These mesogens have the following general structure:

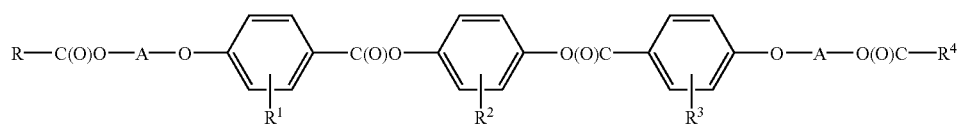

This structure is similar to the structure of the platform molecules except that X and nY are replaced by polymerizable groups wherein:

A is selected from the group consisting of alkyl groups and methyl-substituted alkyl groups having from about 2 to about 12 carbon atoms, preferably having from about 2 to about 9 carbon atoms, more preferably having from about 2 to about 6 carbon atoms, and most preferably having about 6 carbon atoms; and R and R⁴ are polymerizable groups, including but not necessarily limited to nucleophiles and groups comprising at least one electron deficient alkene. Suitable nucleophiles include, but are not necessarily limited to ester groups, organic acid groups, amine groups, hydroxyl groups, and sulfhydryl groups. More preferred polymerizable groups comprise electron deficient alkenes. Suitable electron deficient alkenes independently are selected from the group consisting of substituted and unsubstituted alkenyl ester groups comprising a polymerizable unsaturated carbon-carbon bond, wherein said alkenyl group has from about 2 to about 12 carbon atoms, preferably about 6 carbon atoms. In one embodiment, said substituted alkenyl ester groups comprise a halogen atom selected from the group consisting of chlorine atoms, bromine atoms, and iodine atoms. Preferred alkenyl esters are acryloyl groups and methacryloyl groups. Again, because assymetry suppresses crystallinity while maintaining a nematic state, it is preferred for X and Y to be different groups. One end of a polymerizable mesogen also may comprise a bridging agent, in which case R² may also be hydrogen or group less bulky than a methyl group, due to the inherent assymmetry of the dimer molecule. Dimers are discussed more fully below.

In a preferred embodiment, R² is either a t-butyl group or a methyl group, A is a hexyl group, and one of R and R⁴ is selected from the group consisting of an acryloyl group and a methacryloyl group.

In a preferred embodiment, a proportion of X and/or Y (or R and/or R⁴) comprises a crystallization retardant. A "crystallization retardant" is defined as a substituent that retards crystallization of the monomers without suppressing the $T_{n\text{->}isotropic}$ (the nematic to isotropic transition temperature). The proportion of X and/or Y (or R and/or $R^4$) that comprises a crystallization retardant preferably is sufficient to suppress crystallinity of the mesogenic material, particularly at room temperature for dental applications, and to maintain flowability of the mesogenic material under the particular processing conditions. Suitable crystallization retardants include, but are not necessarily limited to halogen atoms. Exemplary halogen atoms are chlorine, bromine, and iodine, preferably chlorine. Typically, the proportion of the crystallization retardant required is about 3–50 mole %, more preferably 10–15 mole %, and most preferably about 14 mole % or less.

Depending on the sample preparation, the volumetric photopolymerization shrinkage of these materials at room temperature varies from about 0.9 to about 1.7%, which is a factor of 6-4X improvement over commercially available blends containing 2,2-bis[p-(2'-hydroxy-3'-methacryloxypropoxy)phenylene] propane ("bis-GMA"). Preferably, the volumetric polymerization shrinkage is about 3 vol. % change or less, more preferably about 2 vol. % change or less.

Mesomers of higher temperature nematic stability are "mesogenic dimers," formed by reacting X and Y with opposite ends of a bridging agent. Examples of suitable bridging agents include, but are not necessarily limited to dicarboxylic acids (preferably α,ω-carboxylic acids) having from about 4 to about 12 carbon atoms, preferably from about 6 to about 10 carbon atoms, and oligodialkylsiloxanes preferably comprising alkyl groups having from about 1 to about 3 carbon atoms, most preferably methyl groups.

New Synthetic Pathways to Make the Mesogens

In the past, polymerizable mesogens having the foregoing structure were synthesized by a multistep process ("Scheme 1"), as shown below:

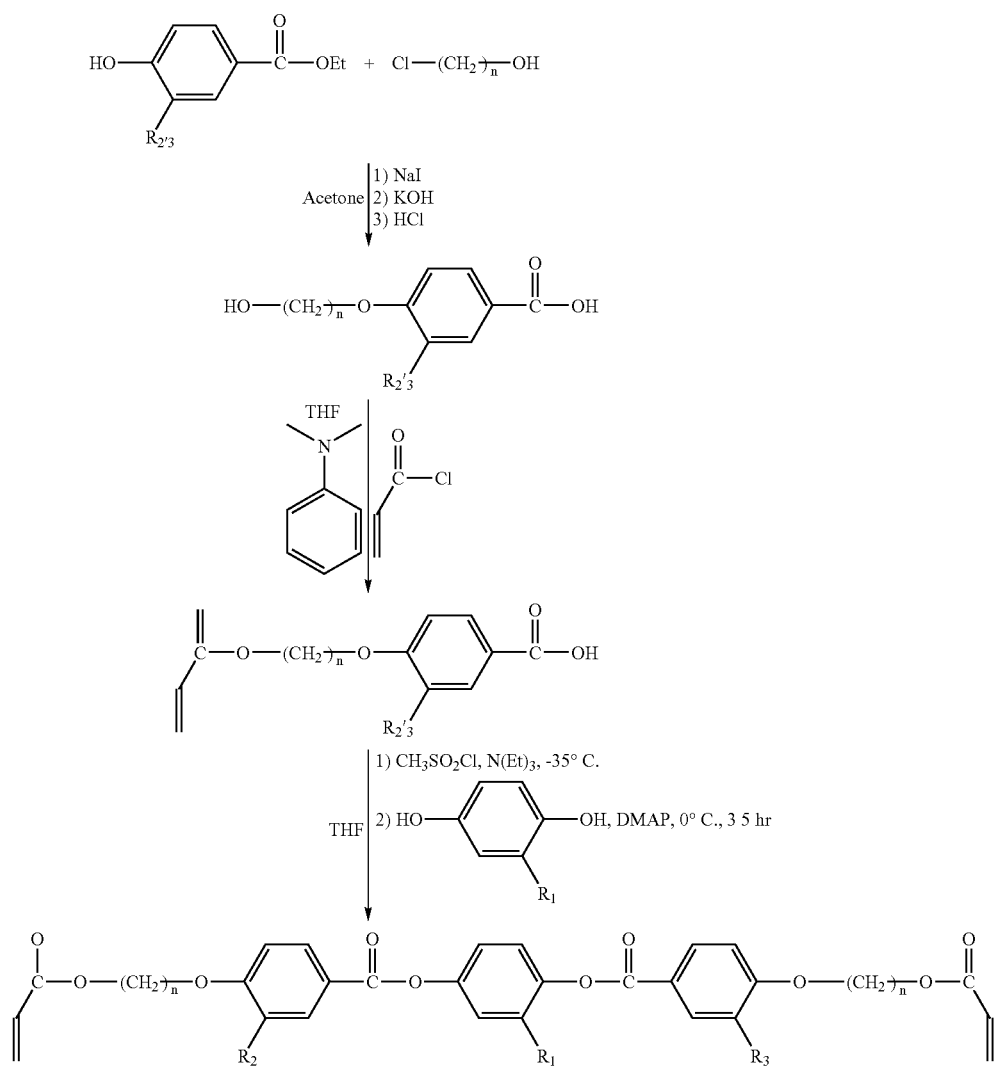

In Scheme 1, molecular ends containing the outer aromatic groups and the alkyl groups were produced first and then coupled to the central aromatic group by diaryl ester bonds. Specifically, the alkali phenoxide salt of p-hydroxybenzoic acid-ethyl ester nucleophile attacked the 6-hydroxy 1-chloro hexane with the aid of iodide catalyst to produce the 6-hydroxyhexyloxybenzoic acid (after hydrolysis of the ethyl ester) by a procedure that yielded at best 70% product. Although rather straightforward, the commercial potential of this synthesis has been limited by the use of the 6-hydroxy 1-chlorohexane. The reaction is run in acetone over several days and requires significant workup. The reaction also produces only about a 40% overall yield, at best, and requires column separation to separate monosubstituted from disubstituted material.

The present application provides new synthetic pathways that use relatively low cost materials to synthesize a central aromatic component comprising end groups that are easily reacted with the desired polymerizable groups. The methods are qualitative, produce high yields, the products are easily purified (preferably by crystallization), and many of the products are more stable than bisalkenes, which must be stabilized against polymerization.

Brief Summary of the Processes

According to the present application, functionalities on a phenylene ring at para-positions (preferably hydroxyl groups) form ester linkages with one of two functionalities in para-positions on two other phenylene rings. The result is three-ring platform molecules having terminal functionalities. One or both of the terminal functionalities may be coupled with polymerizable groups, preferably a nuceleophile and/or an electron deficient alkene-containing group, to produce polymerizable mesogens.

Preparation of Molecular Ends and Coupling to Central Aromatic Group

In a first embodiment (Scheme 2), the molecular ends of the mesogen (outer aromatic and alkyl groups) are prepared and coupled to the central aromatic group by diaryl ester bonds. This synthetic pathway is illustrated and described in detail below:

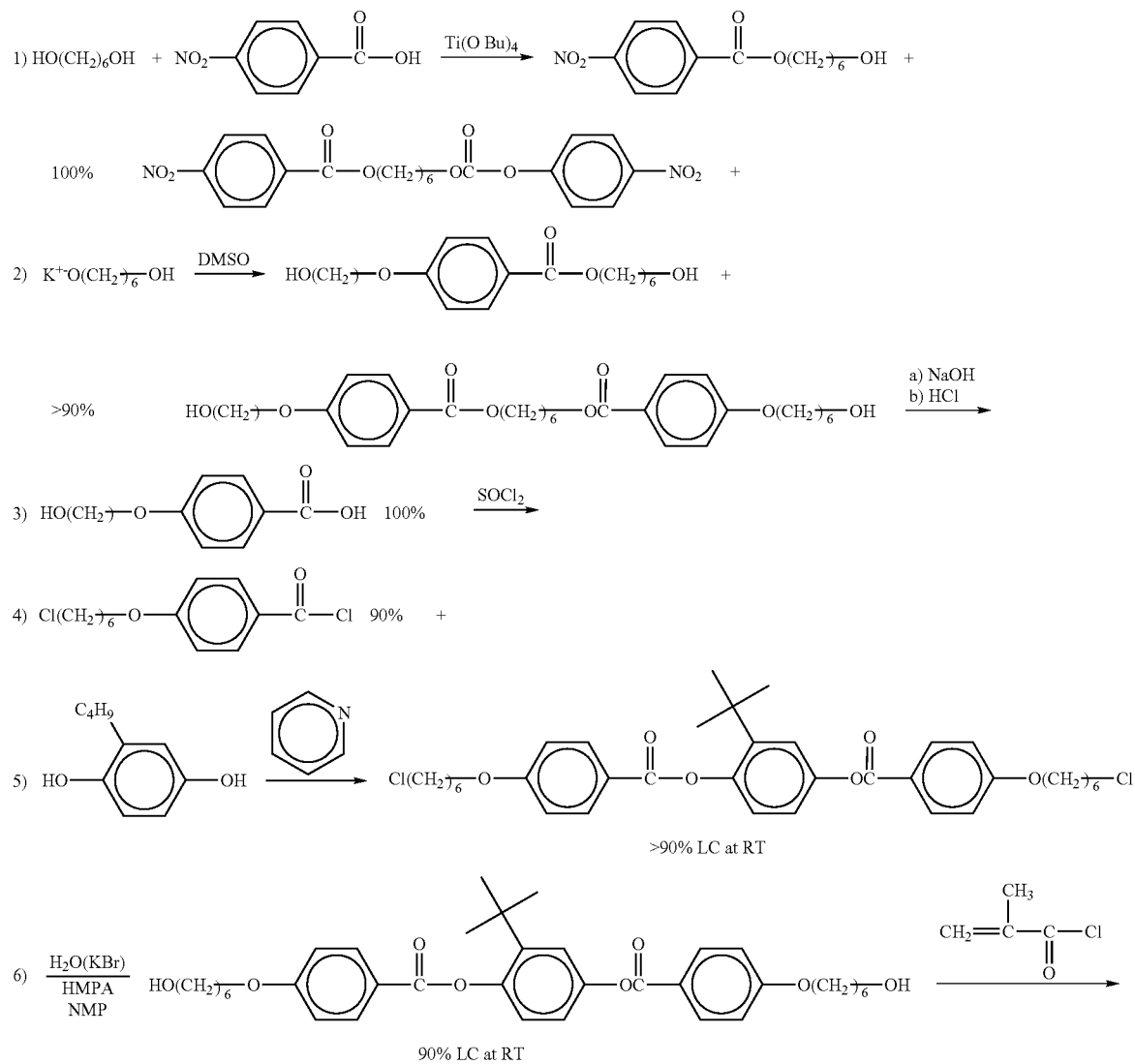

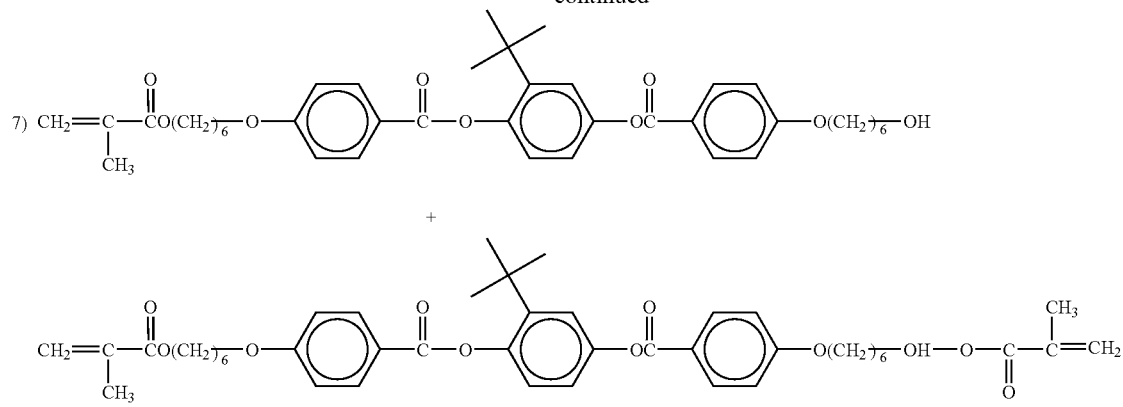

Exemplary "platform molecules" are illustrated in (6), above.

To summarize Scheme 2, bis 1,4 [4"-(6'-chloroalkyloxy) benzoyloxy]R²-phenylene, preferably bis 1,4 [4"-(6'-chlorohexyloxy) benzoyloxy]t-butylphenylene, is converted to the analogous bis ω-hydroxy or ω-hydroxy chloro compound. The hydroxy-compound (the platform molecule) may be terminated with one or more polymerizable groups. Preferred polymerizable groups are nucleophilic and electron deficient groups, most preferably independently selected from the group consisting of acryloyl groups, methacryloyl groups, and cinnamoyl groups.

More particularly:

(1) 4-nitrobenzoic acid is dissolved in an excess of the desired 1,6-dihydroalkane, preferably 1.6-dihydroxyhexane, in the presence of a suitable esterification catalyst. Suitable catalysts include, but are not necessarily limited to titanium alkoxides, tin alkoxides, sulfonic acid, and the like. A preferred catalyst is Ti(OBu)$_4$. The dissolution occurs at atmospheric pressure at a temperature of from about 120° C. to about 140° C., with stirring. If excess alcohol is used, the majority product is the 6-hydroxyalkyl ester of 4-nitrobenzoic acid plus some bis 1,6-(4-nitrobenzoyloxy) alkane, preferably 1,6-(4-nitrobenzoyloxy) hexane. The byproduct water is removed using suitable means, preferably under vacuum during the course of the reaction.

(2) One or more suitable solvents are added to the reaction mixture, along with alkali salts of diols. Suitable solvents include, but are not necessarily limited to aprotic solvents in which nucleophilic attack is preferred. Examples include, but are not necessarily limited to dimethyl sulfoxide (DMSO), dimethyl formamide (DMF), dimethyl acetamide (DMAC), hexamethyl phosphonamide (HMPA). A preferred solvent is dimethylsulfoxide (DMSO), which is environmentally safe and relatively inexpensive. Suitable salts comprise cations effective to displace hydrogen and to produce the mono-cation salt of the alkanediol, preferably the nucleophilic monosodium salt of hexanediol, in the presence of excess alkyldiol, preferably hexanediol. Preferred salts include, but are not necessarily limited to NaH or KOBu$^t$. The salt of the alkane diol, preferably hexane diol, then displaces the activated nitro group to produce 4-(1-hydroxyalkyloxy)benzoic acid (1-hydroxyalkyl ester) and some of the dimeric compound. A preferred product is 4-(1-hydroxyhexyloxy)benzoic acid (1-hydroxyhexyl ester) and some of the dimeric compound. See N. Kornblum et al., J. Org. Chem., 41(9), 1560 (1976), incorporated herein by reference (nucleophilic displacement of nitro-group).

(3) The mixture from (2) is diluted with an aqueous base and heated to completely cleave the aryl-alkyl ester to produce the desired 4-(6'-hydroxyakyloxy)benzoic acid by precipitation subsequent to acidification. Suitable aqueous bases include, but are not necessarily limited to inorganic bases, a preferred base being aqueous sodium hydroxide. Suitable acids include, but are not necessarily limited to inorganic acids, a preferred acid being hydrochloric acid. In a preferred embodiment, 4-(1-hydroxyhexyloxy)benzoic acid (1-hydroxyhexyl ester) is diluted with aqueous sodium hydroxide and then acidified using hydrochloric acid to produce 4-(6'-hydroxyhexyloxy)benzoic acid. The supernatant contains sodium chloride and nitrite, which can be removed and recovered by vacuum evaporation of the solvent. In a preferred embodiment, the solvents evaporated are DMSO, hexanediol and water, which may be discarded. DMSO and hexanediol can be recovered from the water phase by known distillation procedures.

(4) In a preferred embodiment, for small scale procedures, a quantitative conversion of the 4-(6'-hydroxyalkyloxybenzoic acid to 4-(6'-chloroalkyloxy) benzoyl chloride is accomplished by mixing with thionyl chloride diluted in a suitable solvent, preferably toluene, in the presence of pyridine base. In a preferred embodiment, 4-(6'-hydroxyhexyloxy)benzoic acid is converted to 4-(6'-chlorohexyloxy)benzoyl chloride in this manner. On a larger scale, the foregoing reaction is implemented with simple addition of SOCl$_2$ and venting of the byproduct SO$_2$ and HCl.

(5) The highly reactive 4-(6'-chloroakyl)benzoyl chloride is coupled to a hydroquinone bearing the desired bulky group, R². In a preferred embodiment, 4-(6'-chlorohexyl) benzoyl chloride is mixed at room temperature with t-butyl hydroquinone in ether with pyridine, used as catalyst and as a base to take up released HCl, to form bis 1,4 [4"-(6'-hydroxyhexyloxy)benzoyloxy]t-butylphenylene. The reaction is quantitative and produces a high yield of the desired product. In addition, the bis 1,4 [4"-(6'-chloroalkloxy) benzoyloxy]R²-phenylene, preferably bis 1,4 [4"-(6'-chlorohexyloxy)benzoyloxy]t-butyl phenylene, is easily purified from the reaction mixture by crystallization. In addition, the bischlorocompound is stable and need not be stabilized against polymerization (as must bis-alkene compounds).

(6) The bischlorocompound is hydrolyzed to the platform molecule, preferably bis 1,4 [4"-(6'-chlorohexyloxy) benzoyloxy]t-butylphenylene, by simple heating in an aprotic solvent in the presence of water and potassium bromide [R. O. Hutchins and I. M. Taffer, J. Org. Chem, 48, 1360 (1983)]. Again, the reaction is quantitative with the product being purified by recrystallization. The reaction can be stopped at intermediate times to produce any desired mixture of monofunctional and difunctional alcohol molecules. In addition, the chloro-terminated molecules can be converted to the more reactive iodo-terminated species by simple exchange with NaI in acetone.

(7) The dialcohol or mixed alcohol/alkyl chloride is easily reacted with one or more polymerizable groups, preferably Michael addition reactants. In a preferred embodiment, one or more of the dialcohol ends is reacted with alkenyl chlorides to form reactive alkenyl esters, which can have any ratio of alkenyl ester, halide, or alcohol termini. The ratio can be adjusted to adjust the crosslink density and the liquid crystal transition temperatures.

Selective Ether Cleavage

In a preferred embodiment, 4-alkoxy benzoyl chloride, preferably commercially available 4-methoxy benzoyl chloride, is reacted with a hydroquinone substituted with a desired $R^2$ group to produce the corresponding aromatic ester, bis 1,4 [4-alkoxybenzolyoxy]phenylene, preferably bis 1,4 [4-methoxybenzolyoxy]phenylene. The reaction takes place in the presence of an appropriate HCl scavenger and solvent. Suitable HCl scavengers include, but are not necessarily limited to aromatic and aliphatic amines, with a preferred HCl scavenger being pyridine. The pyridine also may be used in combination with a trialkyl amines having from about 2–4 carbon atoms, preferably triethyl amine.

In a second "step," the alkoxy group is cleaved to result in a reactive hydroxyl group while leaving the aromatic ester and thus the triaromatic mesogen structure intact. See M. Node et al., J. Org. Chem., 45, 4275 (1980)] (FIG. 7a). incorporated herein by reference. Node suggests that the methyl ether of bis 1,4 [4-methoxybenzolyoxy]phenylene can be selectively cleaved in the presence of a nucleophile, preferably a thiol, and a Lewis acid, such as aluminum chloride, to produce bis 1,4 [4-hydroxybenzoyloxy]phenylene. [See M. Node et al., J. Org. Chem., 45, 4275 (1980)] ("Node"), incorporated herein by reference. However, Node describes cleaving methyl ethers in the presence of aliphatic esters—not in the presence of aromatic esters. In initial experiments using the conditions described in Node, the more unstable aromatic esters underwent significant ester cleavage because the product complex remained in solution where additional reaction can occur.

Surprisingly, selective cleavage of the aliphatic ether in the presence of the aromatic esters was induced at low temperatures using much higher methyl ether concentrations than those described in Node. Using high concentrations of the ether and much lower concentrations of the nucleophile induced a "complex"—containing the dihydroxy product with intact aromatic ester bonds—to precipitate from the reaction mixture at short reaction times as the complex was formed. The precipitated complex decomposed to the desired dihydroxy compound by reacting the complex with water and/or alcohol.

Suitable ethers for use in the reaction include, but are not necessarily limited to alkyl ethers, having from about 1 to about 8, preferably 1 to 4 carbon atoms. A most preferred ether is methyl ether. Suitable nucleophiles for use in the reaction include, but are not necessarily limited to aliphatic thiols. Preferred nucleophiles are liquid alkanethiols, which typically have 11 carbon atoms or less. A most preferred nucleophile is ethane thiol.

Preferably, a minimum amount of thiol is used to dissolve aluminum chloride in the presence of the ether and a solvent. A most preferred embodiment uses at least 1 mole of thiol per mole of alkyl ether, preferably 2 moles of thiol per mole of alkyl ether. A most preferred embodiment uses 7 mmol of the methyl ether per ml of ethane thiol.

The aluminum chloride to ether ratio should be 4:1 or more, as this appears to be the ratio needed for complexation. At ratios of aluminum chloride to thiol of above 5, more of the complex will stay in the solution before saturation occurs thus resulting in aromatic ester cleavage and reduced yield. The use of less aluminum chloride will result in an incomplete cleavage of the methyl ether. The use of more aluminum chloride, in excess of 4 to 1, has shown no effect in increasing the reaction rate, but slight excesses such as, 4.5 to 1 can compensate for residual water in the system.

Suitable solvents for use in the reaction are halogenated solvents, preferably chlorinated solvents, most preferably dichloromethane. The solvent concentration can range from a molar excess of from about 3 to about 7, preferably about 5 or more, in relation to the nucleophile (thiol), as needed to keep the solution in a slurry as precipitate forms. However, dichloromethane above a 5 molar excess should be added slowly as the reaction proceeds since high initial concentration of the methylene chloride will hinder the reaction rate.

The reaction preferably is started under dry conditions at about 0° C. but can be allowed to warm to room temperature (~25° C.) as it proceeds. The reaction should not go above room temperature or ester cleavage can occur.

Upon increasing methyl ether concentration to 35× the concentrations used by Node, the solubility limit of the product complex was exceeded, permitting the complex to crystallize out of the reaction mixture before the aromatic esters had an opportunity to cleave. Quantitative yields were obtained when the complex crystallized directly from the reaction mixture, effectively removing the molecule from further reaction that would form side products:

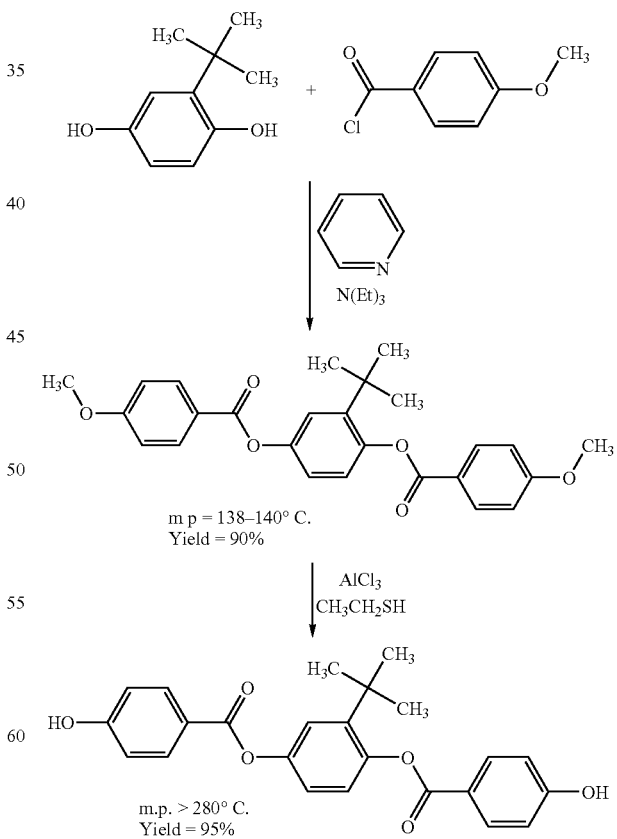

The diphenolic platform mesogens can be lengthened by reacting additional 4-methoxy benzoyl chloride with bis 1,4

[4'-methoxybenzoyloxy]t-butylphenylene to produce the dimethoxy compound with four or five aromatic rings, depending upon the reactant ratios. Cleavage with Lewis acid and thiol produces the respective elongated diphenolic platform molecules:

t-butylphenylene, C0[H,TB,H](OH)$_2$, is synthesized by coupling p-anisoyl chloride with t-butyl hydroquinone and then cleaving the methoxy end groups, as described above, preferably using ethanethiol and aluminum chloride. This molecule can be further extended by reaction with p-anisoyl

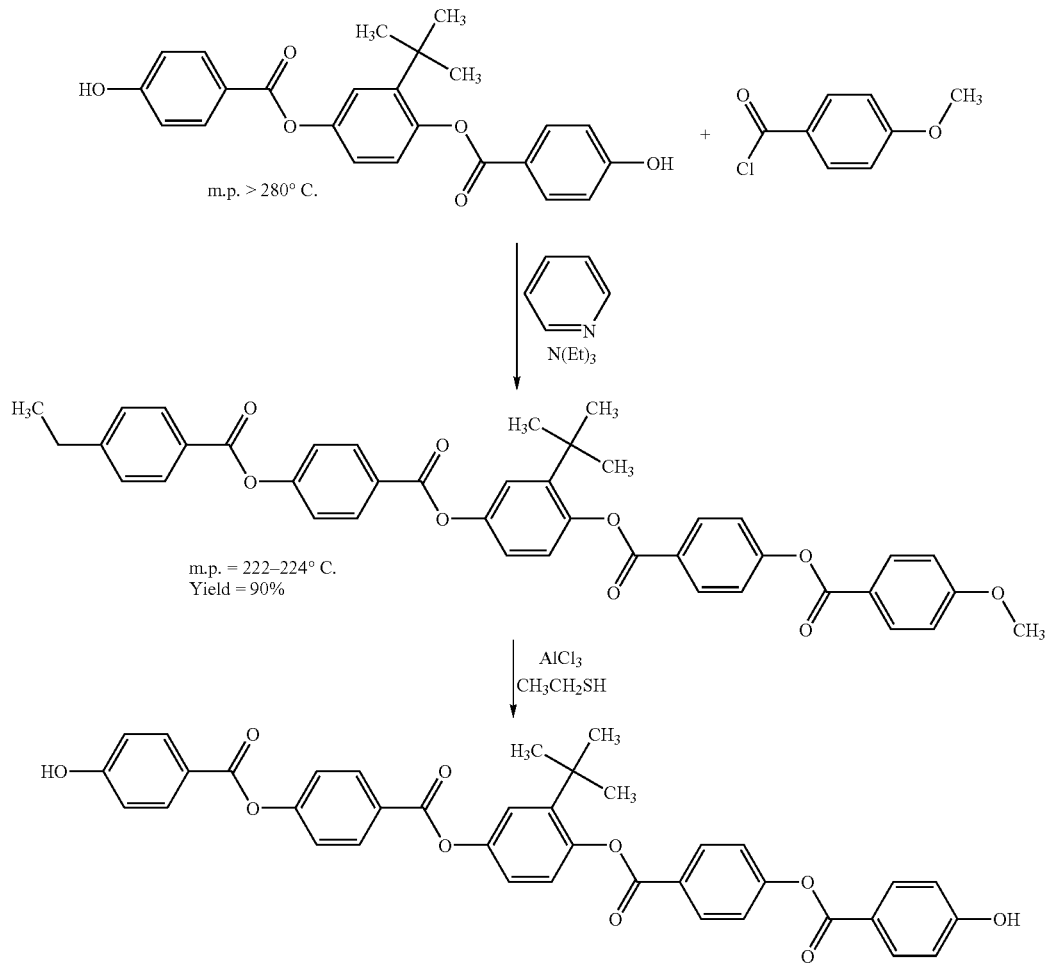

The phenolic end group(s) are esterified by acyl chlorides, thus providing a route to polymerizable mesogens. For example, reaction of C0[H,TB,H](OH)$_2$ with methacryloyl chloride formed the monoester which was coupled to bifunctional sebacoyl chloride to form an alkyl diester linked, methacrylate terminated liquid crystalline monomer, {C0[H,TB,H](MeAcry)(O)}$_2$ (seb) with T$_{n->I}$ of 145° C. and a T$_g$ of 25° C. This monomer had no tendency to crystallize since the synthesis yielded three different isomers with differing mutual orientation of t-butyl groups. The material is highly viscous, however, making processing close to room temperature, and thus T$_g$, somewhat inconvenient.

Formation of Dimers

Preferred non-reactive dimeric and polymeric derivatives of C$_6$[H,TB,H] type mesogenic cores are much more unlikely to crystallize [S. Lee et al., Macromol., 27(14), 3955 (1994)]. In addition, blends of non-reactive dimeric with monomeric derivatives (C$_6$[H,TB,H](Me)$_2$ generated a phase diagram with isotropic, isotropic+nematic and finally, at the lowest temperatures, a nematic phase. Adding polymer to the monomer substantially increases T$_{n->n+I}$.

Briefly, in order to make the dimer molecule, a second mesogenic, platform molecule, 1,4 [4'-hydroxybenzoyloxy]

chloride and the same methoxy cleavage reaction. Fully aromatic diphenol terminated mesogens of any length can be thus produced.

Reaction of C0[H,TB,H](OH)$_2$ with a less than stoichiometric amount of methacryloyl chloride forms the monoester and diester. The monoester and diester are washed away from the diphenol starting material with methylene chloride and the monoester is separated from the diester as an insoluble solid by diluting the methylene chloride solution into hexane.

The monoester can be coupled to bifunctional sebacoyl chloride to form an alkyl diester linked, methacrylate terminated liquid crystalline monomer, {C0[H,TB,H](MeAcry)(O)}$_2$ (seb) with T$_{n->I}$ of 145° C. and a T$_g$ of 25° C. This monomer has no tendency to crystallize since the synthesis yields three different isomers with differing mutual orientation of t-butyl groups. However, processing close to room temperature, and thus T$_g$, is inconvenient because of the high viscosity of the material. As expected the most stable conformation of {C0[H,TB,H](MeACry)(O))}$_2$(seb) is an extended form with a very high molecular length to width ratio which is likely to form high T$_{n->I}$ liquid crystal monomers.

A minimum energy conformation of a preferred mesogenic dimer is decanedioic acid bis-(4-{2-tert-butyl-4-[4-(2-methyl-acryloyloxy)-benzoyloxy]-phenoxycarbonyl}-phenyl)ester {C0[H,TB,H](MeAcry)(O)}₂(seb): butyl-4-[4-(hydroxy)-benzoyloxy]-phenoxycarbonyl}-phenyl) ester and decanedioic acid bis-(4-{2-tert-butyl-4-[4-(2-methyl-acryloyloxy)-benzoyloxy]-phenoxycarbonyl}-phenyl) ester are made as illustrated below:

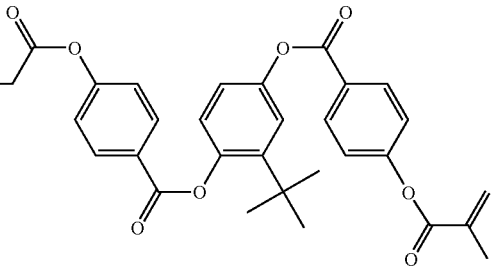

C₆₆H₆₆O₁₆
Exact Mass: 1114.44
Mol. Wt.: 1115.22
C, 71.08; H, 5.97; O, 22.95

Alternately, the partially or completely methacryloylated or acryloylated versions of decanedioic acid bis-(4-{2-tert-

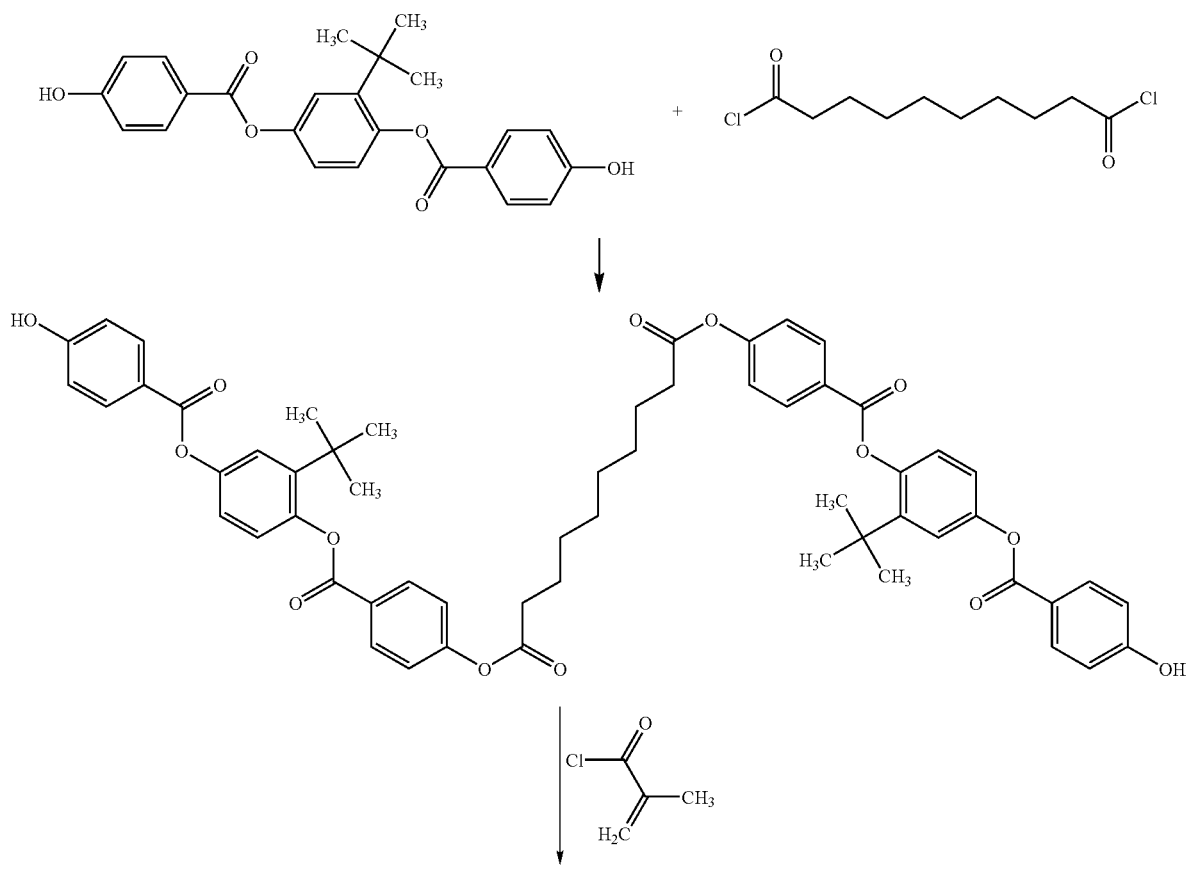

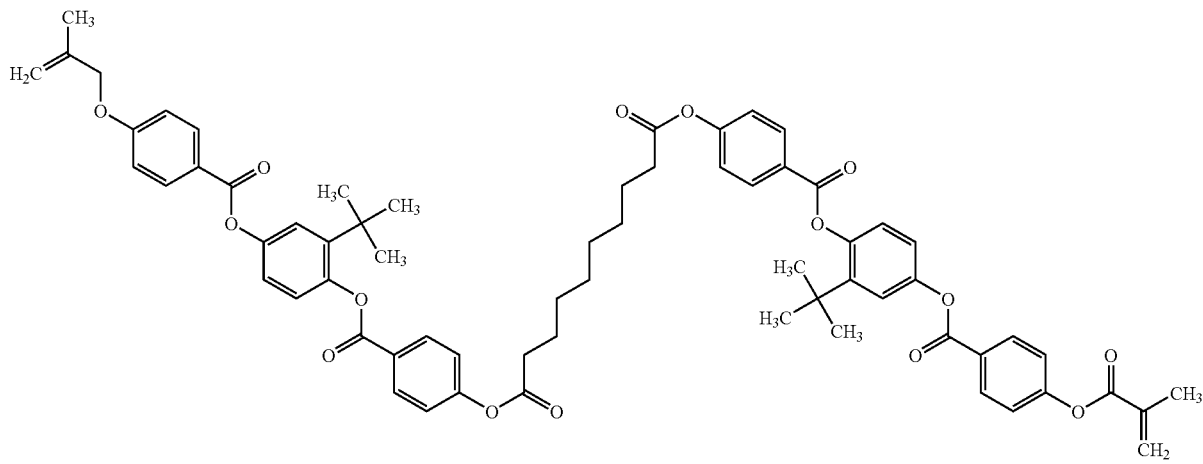

The first reaction product in the above figure is a novel alkylenedioic bis-(4-{2-alkyl-4-[4-(hydroxy)-benzoyloxy]-phenoxycarbonyl}-phenyl) ester having the following general structure:

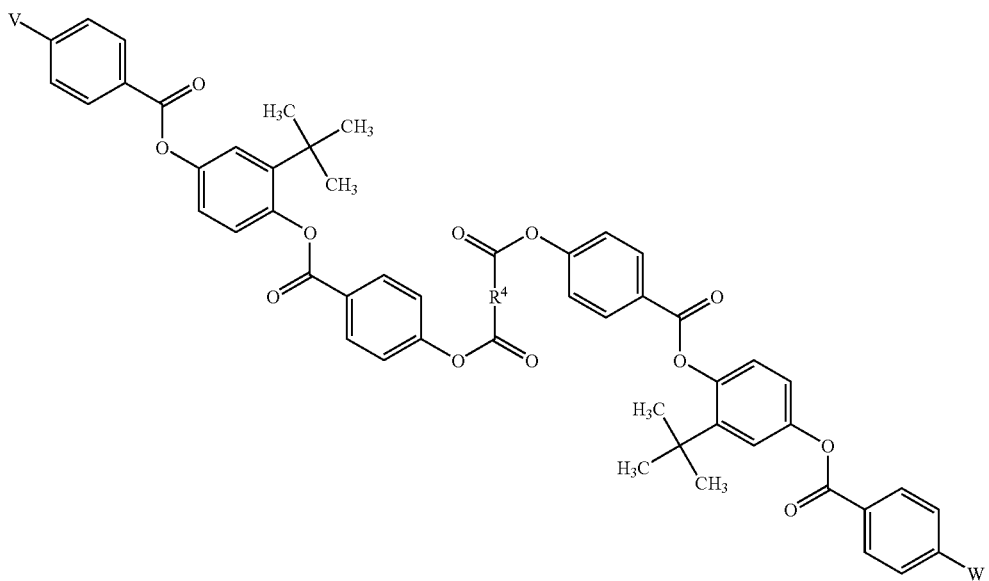

wherein
R⁴ has from about 2 to about 20 carbon atoms, preferably from about 2 to about 12 carbon atoms, and most preferably from about 6 to about 12 carbon atoms.
the alkyl substituent on the central aromatic group of the aromatic ends includes, but is not necessarily limited to t-butyl groups, isopropyl groups, and secondary butyl groups. Most preferred are t-butyl groups; and,
V and W are selected from the group consisting of terminal functionalities and polymerizable groups. In platform molecules, V and W are terminal functionalities. In polymerizable mesogens, V and/or W are polymerizable groups.

The same procedures may be used to make mesogens having the following general structure:

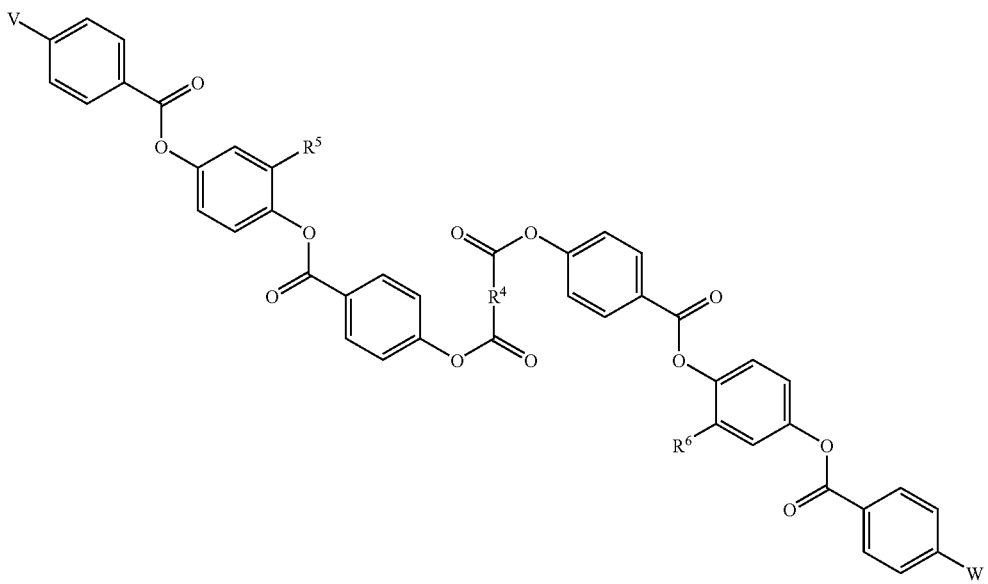

wherein
R⁵ and R⁶ are selected from the group consisting of hydrogen, halogen, alkyl groups having from about 1 to 6 carbon atoms, and aryl groups; and,
V and W independently are selected from the groups comprising polymerizable groups and terminal functionalities.

Suitable terminal functionalities independently are selected from the group consisting of hydroxyl groups, amino groups, and sulfhydryl groups. Most preferred terminal functionalities are hydroxyl groups.

Suitable polymerizable groups may be polymerized by either nucleophilic addition, free radical polymerization, or a combination thereof. Preferred polymerizable groups are polymerizable by Michael addition. Michael addition requires the addition of a nucleophile and an electron deficient alkene. Groups suitable for polymerization by Michael addition include but are not necessarily limited to the examples found in A. Michael, *J. Prakt. Chem.* [2] 35, 349 (1887); R. Connor and W. R. McClelland, *J. Org. Chem.*, 3, 570 (1938); and C. R. Hauser, M. T. Tetenbaum, *J. Org. Chem.*, 23, 1146 (1959), all of which are incorporated by reference herein.

Examples of suitable polymerizable groups include, but are not necessarily limited to substituted and unsubstituted alkenyl ester groups comprising a polymerizable unsaturated carbon-carbon bond, wherein said alkenyl group has from about 2 to about 12 carbon atoms, preferably from about 2 to about 9 carbon atoms, more preferably from about 2 to about 6 carbon atoms. Preferred alkenyl esters are acryloyloxy groups and methacryloyloxy groups. V and W may be the same or different, depending upon the application. In a preferred application—a dental application—V and W comprise terminal alkenyl groups.

These alkylenedioic bis-(4-{2-alkyl-4-[4-(hydroxy)-benzoyloxy]-phenoxycarbonyl}-phenyl) esters are novel compounds, and may be used as "platform molecules," or polymerizable mesogens. A most preferred alkylenedioic bis-(4-{2-alkyl-4-[4-(hydroxy)-benzoyloxy]-phenoxycarbonyl}-phenyl) ester is decanedioic acid bis-(4-{2-tert-butyl-4-[4-(hydroxy)-benzoyloxy]-phenoxycarbonyl}-phenyl) ester.

In order to make the dihydroxyaromatic terminated mesogens, 1,4 bis(4'-hydroxybenzoyloxy) t-butylphenylene or bis-(4-{2-tert-butyl-4-[4-(hydroxy)-benzoyloxy]-phenoxy carbonyl}-phenyl) ester is dissolved in a solvent at a ratio of about 10 ml. solvent per gram. The material is dissolved in the solvent under an inert gas, preferably dry nitrogen. Suitable solvents are heterocyclic bases, with a preferred solvent being pyridine. This first mixture is diluted with a chlorinated organic solvent, preferably methylene chloride, in an amount equal to the volume of pyridine.

A second mixture is formed by dissolving an alkyloyl chloride in a chlorinated organic solvent at a ratio of about 10 ml solvent per gram of alkyloyl chloride. A preferred chlorinated organic solvent is methylene chloride. The alkyloyl chloride comprises an alkyl portion having from about 2 to about 20 carbon atoms, preferably from about 6 to about 20 carbon atoms, more preferably from about 6 to about 12 carbon atoms, and most preferably is sebacoyl chloride. This second mixture includes at least some of benzoquinone inhibitor, suitable concentrations being from about 1 to about 100 ppm, with a preferred concentration being about 10 ppm. The second mixture is added slowly to the first mixture with stirring, preferably with a syringe through a suba seal. After about 24 hours at room temperature, a precipitate is seen. The solvent, preferably methylene chloride and pyridine, are pumped off.

Any remaining pyridine is converted to a salt using a suitable acid, preferably hydrochloric acid, and the salt is removed by washing with water. Water is filtered off from the remaining white precipitate. Residual water is removed using a suitable solvent, preferably acetone, to dissolve the remaining precipitate, which is then stirred with a suitable amount of magnesium sulfate. The solution is dried down and a dissolved in a chlorinated organic solvent, preferably methylene chloride (DCM), is added to dissolve the solid. After 24 hours at room temperature the unreacted 1,4 bis(4'-hydroxybenoyloxy) t-butylphenylene crystallizes out of solution as a white precipitate and separated from the mixture. The solution was then placed in the freezer overnight and decanedioic acid bis-(4-{2-tert-butyl-4-[4-(hydroxy)-benzoyloxy]-phenoxycarbonyl}-phenyl) ester precipitates out of solution. Silica and basic alumina may be added to absorb any remaining methacrylic acid or carboxylic acid terminated products.

Aromatic terminated mesogens (herein called "mesogenic dimers"), such as the foregoing, are used as a diluent and blended with the aliphatic terminated mesogens (herein called polymerizable mesogen) to form the polymerizable mixture. The quantity of mesogenic dimer in the blend will vary depending upon the dimer and its impact on transition temperature, final product, etc.

Reaction of Dimethyl Amine or Dichloro Terminated Oligodimethylsiloxanes with the Mono Methacrylate Ester of 1,4 [4'-hydroxybenzoyloxy]t-butylphenylene Molecules with high temperature stability can be prepared by reacting dimethyl amine or dichloro terminated oligodimethylsiloxanes with the mono methacrylate ester of 1,4 [4'-hydroxybenzoyloxy]t-butylphenylene, as shown below:

hours, preferably about 4 hr. The pyridine is removed under vacuum, and the mixture is extracted into ethyl ether. Amine hydrochloride is removed by vacuum filtration and the remaining solids are washed with a suitable solvent, such as water and acetone. The product had a melting point of 222–224° C. and the structure of the molecule was confirmed by NMR to be the aromatic dimethoxy compound.

Low Polymerization Shrinkage

The mesogens exhibit low polymerization shrinkage. Polymerization shrinkage is measured by codissolving the monomers in dichloromethane with 0.3 wt. % camphorquinone photoinitiator, 100 ppm benzoquinone and 1 wt. % N,N' dimethylaminoethyl methacrylate activator and subsequently pumping off the solvent, all under yellow light. The monomers are then polymerized in film or droplet form in less than 1 minute by exposure to a dental curing light (Dentsply Spectrum Curing Lamp) with a significant output at 420 nm.

FTIR spectroscopy (Nicolet Magna-IR 560) is used to measure the degree of cure by observing the decrease in the

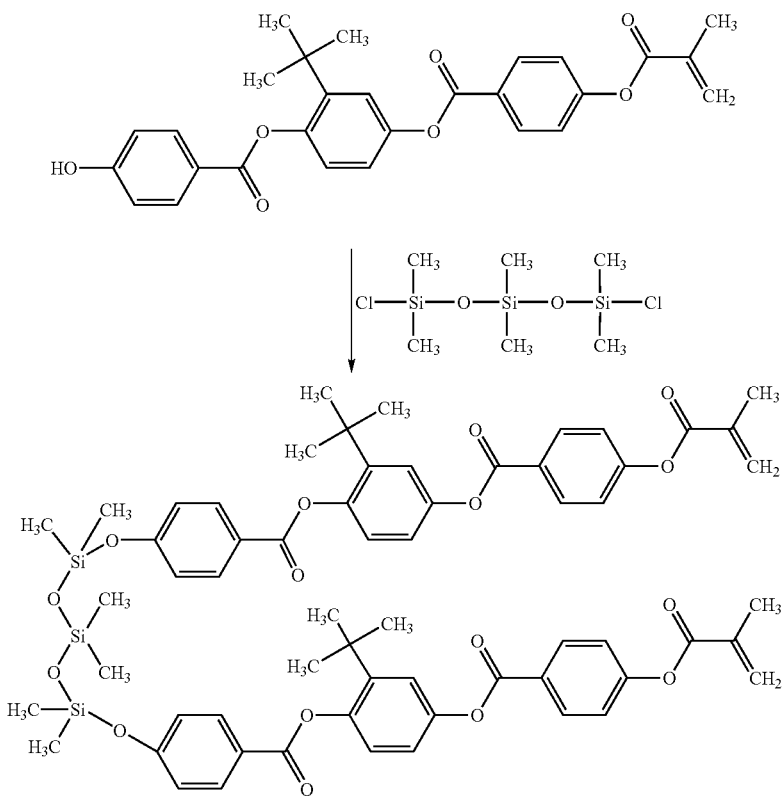

In this embodiment, the mesogenic platform molecule 1,4 [4'-hydroxybenzoyloxy]t-butylphenylene is further extended by reaction with p-anisoyl chloride and subsequent ether methyl group cleavage with aluminum chloride and ethane thiol. Fully aromatic diphenol terminated mesogens of any length can be thus produced. Reaction with acryloyl or methacryloyl chloride forms the monoester, which can be coupled to reactive aliphatic or siloxane oligomers to form polymerizable liquid crystals with reactive ends.

Formation of Alkoxy Terminal Functionalities

In order to produce alkoxy functionalities, an excess of anisoyl chloride is mixed with a desired 1,4 bis(4'-hydroxybenzoyl oxy)-$R^2$ phenylene, (preferably a t-butylphenylene) in an excess of pyridine and triethyl amine (about a 10:1 ratio) with stirring under nitrogen for several $1637$ cm$^{-1}$ alkene band vs. the aromatic internal thickness band at $1603$ cm$^{-1}$. Thin film measurements that avoid oxygen inhibition are performed by sandwiching the monomer between polyvinylidene chloride films, which have an optical window in the wavelength region of interest. The IR spectrum of solid droplets is evaluated using a single bounce reflectance measurement. The flat bottom surface of the droplet is pressed against the germanium lense of a Spectra Tech Thunderdome attachment.

Polymerization of the monomers can be observed between transparent polyvinylidene chloride films under cross-polarized optical microscopy in the heated stage of a Nikon Optimat microscope. Little change in the local birefringence and thus local orientation is noted upon polymerization at room temperature or upon heating to 180° C.

Fracture Toughness

Compact tension samples (ASTM E399) with known edge crack length are fabricated by photocuring monomer with initiator and activator in silicone molds. After polishing the surface with 600 grit polishing agent and soaking in physiologic saline at 37° C. for 24 hours the samples are tested at room temperature under displacement control at 1 mm/min until failure.

The fracture toughness of the crosslinked, amorphous glass is as high as possible, suitably 0.4 Mpa-m$^{1/2}$ or higher, preferably 0.5 MPa-m$^{1/2}$ or higher, which is the same as that found for photocured, isotropic dimethacrylate based resins such as GTE resin (3M company).

Fillers

Considerable amounts of soluble impurity can be added to the polymerizable mesogens, or a mixture comprising the polymerizable mesogens, without changing the $T_{nematic->isotropic}$ transition temperature of the polymerizable mesogens. Thus, a high volume fraction of filler can be added to the polymerizable mesogens and still form a composite that maintains desirable, low viscosity flow and low polymerization shrinkage characteristics at temperatures of curing. Commercial products add up to about 70–80 wt % filler. A preferred embodiment uses about 30 wt. % filler.

A variety of fillers may be used. A preferred filler is amphoteric nano-sized metal oxide particles having a diameter in nanometers which is sufficiently small to provide transparency effective for photopolymerization but sufficiently large to provide effective fracture toughness after photopolymerization. Substantially any "metal" capable of forming an amphoteric metal oxide may be used to form the metal oxide particles. Suitable metallic elements include, but are not necessarily limited to niobium, indium, titanium, zinc, zirconium, tin, cerium, hafnium, tantalum, tungsten, and bismuth. Also suitable in place of the metal in the oxide is the semi-metallic compound, silicon. As used herein, unless otherwise indicated, the term "metal oxide" is defined to include silicon, and the word "metal," when used to refer to the metal oxide is intended to also refer to silicon.

The metal oxides may be made of a single metal, or may be a combination of metals, alone or combined with other impurities or "alloying" elements, including, but not necessarily limited to aluminum, phosphorus, gallium, germanium, barium, strontium, yttrium, antimony, and cesium.

A monomeric liquid crystal (LC) containing a high volume fraction of filler nanoparticles is a highly constrained system. As a result, at least for some monomeric species, both smectic and crystalline transitions should be suppressed. The consequent widening of the stability range of nematic mesophase should permit the composite to polymerize at much lower temperatures than in unfilled systems, resulting in lower polymerization shrinkage.

The metal oxide nanoparticles may be prepared using any known methods, such as "sol-gel" techniques, direct hydrolysis of metal alkoxides by water addition, forced hydrolysis of relatively low-cost metal salts, or non-hydrolytic reactions of metal alkoxides with metal halide salts. Examples of such procedures are shown in the following references, each of which is incorporated herein by reference: W. Stöber and A. Fink, J. of Colloid and Interface Science, v. 26, 62–69 (1968); M. Z.-C. Hu, M. T. Harris, and C. H. Byers, J. of Colloid and Interface Science, v. 198, 87–99 (1988); M. Ocaña and E. Matijević, J. of Materials Research, v. 5(5), 1083–1091 (1990); L. Lerot, F. LeGrand, P. de Bruycker, J. of Materials Science, v. 26, 2353–2358 (1991); H. Kumazawa, Y. Hori, and E. Sada, The Chemical Eng'g. Journal, v. 51, 129–133 (1993); S. K. Saha and P. Pramanik, J. of Non-Crystalline Solids, v. 159, 31–37 (1993); M. Andrianainarivelo, R. Corriu, D. Leclercq, P. H. Mutin, and A. Vioux, J. of Materials Chemistry, v. 6(10), 1665–1671 (1996); F. Garbassi, L. Balducci, R. Ungarelli, J. of Non-Crystalline Solids, v. 223, 190–199 (1998); J. Spatz, S. Mössmer, M. Mö[umlaut]ller, M. Kocher, D. Neher, and G. Wegner, Advanced Materials, v. 10(6), 473–475 (1998); R. F. de Farias, and C. Airoldi, J. of Colloid and Interface Science, v. 220, 255–259 (1999); T. J. Trentler, T. E. Denler, J. F. Bertone, A. Agrawal, and V. L. Colvin, J. of the Am. Chemical Soc., v. 121, 1613–1614 (1999); Z. Zhan and H. C. Zheng, J. of Non-Crystalline Solids, v. 243, 26–38 (1999); M. Lade, H. Mays, J. Schmidt, R. Willumeit, and R. Schömacker, Colloids and Surfaces A: Physiochemical and Eng'g Aspects, v. 163, 3–15 (2000); and the procedure described in "Sol-gel processing with inorganic metal salt precursors," authored by "Michael" Zhong Cheng Hu, licensable via Oak Ridge National Laboratory under ORNL control number ERID 0456.

The application will be better understood with reference to the following examples, which are illustrative only:

EXAMPLE 1

Synthesis of 4-nitrophenylenecarbonyloxy 6'-hexane-1'-ol 60 g 4-nitrobenzoic acid (0.4 mole) was dissolved in 250 ml (2.07 mole) dry hexanediol that had been fused in the reaction vessel at 165° C. 1 ml. tetrabutyltitanate catalyst was added, and the mixture was stirred for 3 hours at 135° C. before cooling to 95° C. where stirring was continued under dynamic vacuum for two days to remove the water of condensation.

The solution was extracted with 1 liter diethyl ether, centrifuged or filtered to remove the catalyst, and then washed two times with 500 ml 5% NaHCO$_3$ to remove unreacted acid and excess diol. After the ether was vacuum evaporated, the residue was dissolved in 150 ml boiling ethanol to which 75 ml water was added. Upon cooling to room temperature bis 1,6-(4 nitrophenylene carbonyloxy) hexane precipitated as 7.61 grams of a yellow powder ($T_m$=112° C.).

The remaining solution was evaporated and redissolved in 150 ml diethyl ether to which was added 75 ml hexane. After crystallization at −20° C. 4-nitrophenylene 4-carbonyloxy 6"-hexane-1'-ol (86.7 grams) was isolated ($T_m$=32–35° C.). NMR indicated that both of these products were greater than 98% purity.

EXAMPLE 2

Synthesis of 4-(6-hydroxyhexyloxy) phenylenecarbonyloxy 6'-hexane 1'-ol 20 ml (0.166 mole) of dry, molten hexanediol was transferred to a flask with an attached short path distillation unit. 200 ml dry dimethylsulfoxide (DMSO) and then 40 ml of 1M KOBu$^t$ was then added to the diol and stirred 45 minutes at room temperature. The Bu$^t$OH and a small amount of DMSO were distilled off under vacuum between 25–50° C. over one hour. 8 ml (0.04 mole) of dry 4-nitrophenylenecarbonyloxy 6'-hexane-1'-ol was added producing a bright blue color that converted to a yellow coloration after 2 hours.

After stirring overnight, the DMSO and excess hexanediol was removed by vacuum distillation at 90° C., whereupon the residue was taken up in 200 ml diethyl ether which was washed twice with 200 ml 5% NaHCO$_3$ and dried with MgSO$_4$. After the ether was distilled away, the solid was dissolved in a minimum amount of boiling ethanol and crystallized at −20° C. A 75–90% yield of the desired white product was obtained (T$_m$=30–33° C.).

EXAMPLE 3

Synthesis of 4-[6-hydroxyhexyloxy]benzoic Acid 1.2 g (0.0037 mole) 4-(6-hydroxyhexyloxy) phenylenecarboxyoxy 6'-hexane 1'-ol was heated for 8 hours at 90° C. in a solution of 0.29 g (0.0074 mole) NaOH in 4 ml water. 20 ml of water was added to the clear solution and 0.3 ml of concentrated HCl added to precipitate the acid at pH=3–5. The white solid was filtered off and dried under vacuum to produce a quantitative yield of the substituted benzoic acid (T$_m$=117° C.).

EXAMPLE 4

Synthesis of 4(6'-chlorohexyloxy)benzoyl chloride

A three times molar excess of thionyl chloride (55 ml) in toluene (300 ml) was dropwise added over 20 minutes to 4-(6'-hydroxyhexyloxy)benzoic acid (60 g, 0.252 mole) suspended in toluene (600 ml) with a stoichiometric amount of pyridine (42 ml) at 0° C. The suspension was continuously stirred for another 8 hours at room temperature, whereupon the toluene and excess thionyl chloride were distilled off at 70–100° C. with a slight nitrogen flow. The remaining slush of the pyridine hydrochloride and product was extracted with 1l boiling hexane and mixed with 5 g basic alumina and 5 g neutral silica and filtered hot. A 90% yield of a very light yellow 4-(6'-chlorohexyloxy)benzoyl chloride liquid was obtained after evaporation of the hexane (T$_m$<20° C.).

EXAMPLE 5

Synthesis of bis 1,4 [4"-(6'-chlorohexyloxy) benzoyloxy]t-butylphenylene 65 g of 4-(6'-chlorohexyoxy)benzoyl chloride (0.23 mole) was added to 16.75 g (0.1 mole) of t-butyl hydroquinone dissolved in 800 ml dry diethyl ether. 10 ml pyridine and 32 ml triethylamine were then added to this mixture. After stirring for 20 hours, the ether was filtered and washed two times with 200 ml 0.1N HCl and 200 ml saturated NaCl solution. The ether solution was then mixed with 10 g basic alumina to remove unreacted acid and 10 g neutral silica to flocculate the suspension and dried over magnesium sulfate. The product starts to crystallize from the ether when the solution is reduced by half. After continued crystallization at −20° C. overnight 63 g of product melting at 95–100° C. could be obtained. Another crop of crystals was obtained by further reducing the solution and crystallizing at −20° C. over one week. NMR purity was >99%.

EXAMPLE 6

Synthesis of bis 1,4 [4"-(6'-iodohexyloxy) benzoyloxy]t-butylphenylene 1.15 g (0.0016 mole) bis 1,4 [4"-(6'-chlorohexyloxy) benzoyloxy]t-butylphenylene dissolved in 20 ml acetone was boiled under nitrogen with 8.0 g NaI in 20 ml acetone for 20 hours. A quantitative yield of bis 1,4 [4"-(6'-iodohexyloxy)benzoyloxy]t-butylphenylene was obtained. The material melted at 76° C. and was >99% pure by NMR.

EXAMPLE 7

Synthesis of bis 1,4 [4"-(6'-hydroxyhexyloxy]t-butylphenylene 36 g of bis 1,4 [4"-(6'-chlorohexyloxy)benzoyloxy]t-butylphenylene was dissolved in 750 ml of n-methypyrrolidinone (NMP) in a single neck flask. 15 g KBr and 120 ml water were then added. The flask was then wired shut with a suba seal, and the solution was heated to 120° C. for 24 hours. Upon cooling, the solution was quenched into 1500 ml water and extracted with 250 ml methylene chloride. After evaporation of the methylene chloride, the solid was extracted with 1l of ether and washed with 1l water and dried with MgSO$_4$. The solution was concentrated and crystallized at −20° C. for 3 days to yield 17 g of white product melting at 80° C. Additional product crystallized from the solution after several weeks. NMR purity was >99%.

Stopping the above reaction at intermediate times yielded mixtures of di-OH terminated, and asymmetric monochloro, monohydroxy compounds.

EXAMPLE 8

Synthesis of bis 1,4 [4"-(6'-methacryloyloxyhexyloxy)benzoyloxy]t-butylphenylene 10 g (0.0165 mole) bis 1,4 [4"-(6'-hydroxyhexyloxy) benzoyloxy]t-butylphenylene was dissolved in 200 ml dry methylene chloride containing 100 ppm benzoquinone (free radical quencher). After cooling the above solution to 0° C. 3.2 ml (0.035 mole) distilled methacryloyl chloride was then added along with 3 ml (0.037 mole) pyridine and the solution was stirred for 24 hours in a sealed flask making no attempt to remove air from the solvent.

The solvent was vacuum evaporated and the resultant solid taken up in 250 ml ether and washed with 250 ml 0.1N H Cl and 250 ml saturated NaCl. After drying with MgSO$_4$ and filtering, the solvent was evaporated to yield 10 g of the desired product as a nematic liquid, which was >98% pure by NMR. This material could be crystallized from diethyl ether at −20° C. to form a white crystalline solid melting at 57° C.

EXAMPLE 9

Synthesis of bis 1,4 [4"-(6'-cinnamoyloxyhexyloxy) benzoyloxy]t-butylphenylene 5 g (0.0825 mole) of bis 1,4 [4"-(6'-hydroxyhexyloxy) benzoyloxy]t-butylphenylene was dissolved in 100 ml dry methylene chloride containing 100 ppm benzoquinone (free radical quencher). After cooling the above solution to 0° C., 3.0 g (0.018 mole) cinnamoyl chloride was then added along with 1.4 ml (0.017 mole) pyridine, and the solution was stirred for 24 hours in a sealed flask making no attempt to remove air from the solvent.

The solvent was vacuum-evaporated and the resultant solid taken up in 100 ml ether and washed with 100 ml 0.1N HCl and 250 ml saturated NaCl. After drying with MgSO$_4$ and filtering, the solvent was evaporated to yield 5 g of the desired product which was >98% pure by NMR. This material could be crystallized from diethyl ether at −20° C. to form a white crystalline solid melting at 70° C.

EXAMPLE 10

Synthesis of bis 1,4 [4"-(6'-acetoxyoxyhexyloxy) benzoyloxy]t-butylphenylene 1 g (0.0165 mole) of bis 1,4 [4"-(6'-hydroxyhexyloxy) benzoyloxy]t-butylphenylene was dissolved in 20 ml dry methylene chloride. After cooling the above solution to 0° C., 0.27 ml (0.0037 mole) acetyl chloride was then added along with 0.3 ml pyridine, and the solution was stirred for 24 hours in a sealed flask.

The solvent was vacuum-evaporated and the resultant solid taken up in 20 ml ether and washed with 20 ml 0.1N HCl and 250 ml saturated NaCl. After drying with $MgSO_4$ and filtering, the solvent was evaporated to yield the product quantitatively at >98% purity by NMR. This material could be crystallized from diethyl ether at −20° C. to form a white crystalline solid melting at 82° C.

EXAMPLE 11

Synthesis of 1,4 Bis(4'-methoxybenzoyloxy)t-butylphenylene

Anisoyl chloride (4.93 g, 0.029 mole), t-butyl hydroquinone (2.00 g, 0.012 mole) in pyridine (50 ml) and triethyl amine (3.2 ml) were stirred under nitrogen for 4 hours with the mixture eventually becoming dark orange/red. The pyridine was removed under vacuum and the mixture was precipitated into ethyl ether (500 ml). Amine hydrochloride precipitated out of solution and was removed by vacuum filtration. The ether was evaporated and the slightly yellow crystals were dissolved in chloroform and extracted with slightly acidified water. The color of the crystals was then removed by stirring over basic alumina and the crystals were then purified by recrystallization in isopropanol. 4.8 grams of material was collected (88% yield) with a melting point of 138–140° C. The structure of the molecule was confirmed by NMR.

EXAMPLE 12

Synthesis of 1,4 Bis(4'-hydroxybenzoyloxy)t-butylphenylene 1,4 Bis(4-methoxybenzoyloxy) t-butylphenylene (0.5 g., 0.00115 mole) and aluminum chloride (1.23 g., 0.00921 mole) were added to ethane thiol (2.5 ml) and dichloromethane (2.5 ml) to form a slightly yellow solution. This mixture was stirred for 1 hour and a white solid precipitated out of solution during this time. The mixture was precipitated into 200 ml of water and extracted with ethyl ether. The ether was evaporated and 0.432 grams were recovered, (92% yield). The melting point was not determined, but was found in be in excess of 280° C.

EXAMPLE 13

Synthesis of 1,4 Bis(4"-(4'-methoxybenzoyloxy) benzoyloxy)t-butylphenylene

The dark orange solution of anisoyl chloride (0.357 g, 2.096 mmole), 1,4 bis(4'-methoxybenzoyloxy) t-butylphenylene (0.355 g, 0.873 mmole) in pyridine (25 ml) and triethyl amine (0.5 ml) were stirred under nitrogen for 4 hr. The pyridine was removed under vacuum, and the mixture was extracted into ethyl ether (200 ml). Amine hydrochloride and the product were insoluble and were removed by vacuum filtration. The amine hydrochloride was removed by washing the solids with water and acetone. The product had a melting point of 222–224° C. and the structure of the molecule was confirmed by NMR.

EXAMPLE 14

Synthesis of 1,4 Bis(4'-methacryloylbenzoyloxy)t-butyphenylene and 1-(hydroxybenzoyloxy),4-(4'-methacryloylbenzoyloxy)t-butylphenylene 0.2 g ($4.92 \times 10^{-4}$ mole) 1,4 bis(4'-hydroxybenzoyloxy) t-butylphenylene was dissolved in 1 ml pyridine containing 10 ppm benzophenone, and to this was slowly added 0.026 ml ($2.46 \times 10^{-4}$ mole) methacryloyl chloride dissolved in 2 ml methylene chloride. After stirring for 12 hours at room temperature, the methylene chloride was pumped off and the remaining pyridine solution was diluted into 0.1 N HCl to neutralize the pyridine and precipitate the product. After washing the precipitate with water and drying under vacuum, the precipitate was taken up into ether and dried with $MgSO_4$. After ether evaporation, the suspension was taken up into 3 ml methylene chloride in which the starting diphenol was insoluble. After filtering away the diphenol, the monomethacrylate ($T_m$=230° C.) was crystallized from the remaining solution at room temperature by the addition of 3 ml hexane. The remaining clear solution contained mainly the dimethacrylate in very small amounts ($T_m$=142° C.).

EXAMPLE 15

Synthesis of bis-(4-{2-tert-butyl-4-[4-(2-methyl-acryloyloxy)-benzoyloxy]-phenoxycarbonyl}-phenyl)ester {C0[H,TB,H](MeAcry)(O)}$_2$ In order to make decanedioic acid bis-(4-{2-tert-butyl-4-[4-(2-methyl-acryloyloxy)-benzoyloxy]-phenoxycarbonyl}-phenyl)ester{CO[H,TB,H](MeAcry)(O)}$_2$ (seb), 0.95 g, 1.95 mmole of 1-(hydroxybenzoyloxy), 4-(4'-methacryloylbenzoyloxy) t-butylphenylene was dissolved in 10 ml dry pyridine under dry nitrogen and then diluted with 20 ml dry methylene chloride. 0.233 g sebacoyl chloride (0.975 mmol) was dissolved in 10 ml dry methylene chloride containing 10 ppm benzoquinone inhibitor and added slowly with syringe through a suba seal into the first solution with stirring. After 29 hours at room temperature a small amount of precipitate was seen and the methylene chloride was pumped off and 0.01 g paradimethylaminopyridine was added as a catalyst to continue the reaction.

After another 24 hours at room temperature, some unconverted phenol was still observed by TLC and 0.5 ml methacryloyl chloride was dissolved in 10 ml dry methylene chloride and added to the reaction mixture to react any unconverted starting material to the dimethacrylate. After 3 hours the phenol had been completely converted and methylene chloride was removed under vacuum.

100 ml of water containing 7.5 ml concentrated HCl was added to the flask with stirring and stirred for four hours to remove the pyridine as the hydrochloride salt (pH=4). The water layer could be poured from the white layer which stuck to the walls of the vessel. After washing once more with deionized water, 100 ml methylene chloride was added to dissolve the solid and the resulting organic phase was transferred to a separatory funnel and washed twice with 100 ml brine saturated water and dried with magnesium sulfate. One gram each of silica and basic alumina were added to absorb any remaining methacrylic acid or carboxylic acid terminated products.

After standing for 8 hours the methylene chloride solution was filtered and added to 500 ml of stirred hexane. After 8 hours the pure precipitated product was collected; the supernatent contained methacrylated starting material.

The white precipitate eluted in 80/20 ether/hexane on silica as a major spot and a very faint following spot. NMR revealed about 95% purity of the desired product (30% yield) with the rest being a methoxy terminated product which was carried over from the diphenol starting material. Solutions could be cast into a translucent, nematic glass at room temperature which gradually softened upon heating.

EXAMPLE 16

Synthesis of Decanedioic Acid bis-(4-{2-tert-butyl-4-[4-(hydroxy)-benzoyloxy]-phenoxycarbonyl}-phenyl)ester 18.25 g, (44.9 mmole) of 1,4 bis(4'-hydroxybenzoyloxy) t-butylphenylene was dissolved in 120 ml dry pyridine under dry nitrogen and then diluted with 100 ml dry methylene chloride. 1.34 g sebacoyl chloride (5.60 mmol) was dissolved in 20 ml dry methylene chloride and added slowly with syringe through a suba seal into the first solution with stirring. After 24 hours at room temperature a small amount of precipitate was seen and the methylene chloride and pyridine were pumped off 300 ml of water containing 7.5 ml concentrated HCl was added to the flask with stirring and stirred for four hours to remove the pyridine as the hydrochloride salt (pH=4). The water was filtered off from the white precipitate that formed in the vessel. 200 ml of acetone was added to dissolve the mixture which was then stirred with 3 grams of magnesium sulfate to remove any remaining water, after which the solution was dried down. 200 ml methylene chloride (DCM) was added to dissolve the solid. After 24 hours at room temperature the unreacted 1,4 bis(4'-hydroxybenoyloxy)t-butylphenylene crystallized out of solution as a white precipitate. The solution was then placed in the freezer overnight and decanedioic acid bis-(4-{2-tert-butyl-4-[4-(hydroxy)-benzoyloxy]-phenoxycarbonyl}-phenyl) ester precipitated out of solution.

The white precipitate eluted in 90/10 DCM/acetone on silica as a major spot and a very faint spots resulting from higher order polymerization. The product had a high NMR purity (>95%).

EXAMPLE 17

Synthesis of Decanedioic Acid bis-(4-{2-tert-butyl-4-[4-(2-methyl-acryloyloxy)-benzoyloxy]-phenoxycarbonyl}-phenyl)ester 0.85 g, (0.868 mmole) of decanedioic acid bis-(4-{2-tert-butyl-4-[4-(hydroxy)-benzoyloxy]-phenoxycarbonyl}-phenyl) ester was dissolved in 20 ml dry pyridine under dry nitrogen and then diluted with 20 ml dry methylene chloride. 0.118 g methacrylol chloride (1.13 mmol) was dissolved in 10 ml dry methylene chloride containing 10 ppm benzoquinone inhibitor and added slowly with syringe through a suba seal into the first solution with stirring. After 24 hours at room temperature a small amount of precipitate was seen and the methylene chloride and pyridine were pumped off.

100 ml of water containing 1.0 ml concentrated HCl was added to the flask with stirring and stirred for two hours to remove the pyridine as the hydrochloride salt (pH=4). The water layer could be poured from the white layer, which stuck to the walls of the vessel. After washing once more with deionized water. 50 ml methylene chloride was added to dissolve the solid and the resulting organic phase was transferred to a separatory funnel and washed twice with 100 ml brine saturated water and dried with magnesium sulfate. One gram each of silica and basic alumina were added to absorb any remaining methacrylic acid or carboxylic acid terminated products. NMR revealed that the product was the desired dialkene terminated monomer.

EXAMPLE 18

Bis 1,4 [4-hydroxybenzoyloxy]2-phenyl-phenylene (100 g, 0.537 mole) of phenylhydroquinone and (229 g, 1.342 mole) of anisoyl chloride were added to 100 ml of pyridine and 500 ml of dry dichloromethane. The mixture was stirred for 72 hours at room temperature under nitrogen gas until it was mostly solidified. The 1,4 bis [4-methoxybenzoyl 2-phenyl phenylene] was recrystallized from isopropyl alcohol for a 96% yield.

(42.72 g, 0.094 mole) of the 1,4 bis [4-methoxybenzoyl] 2-phenyl phenylene was added to a solution consisting of (100 g, 0.749 mole) of aluminum chloride, (58.21 g, 0.937 mole) of ethane thiol and (199.04 g, 2.344 mole) of dichloromethane. After one hour the reaction was quenched with 250 ml of isopropyl alcohol. The solids were filtered and the product 1,4 bis [4-hydroxybenzoyl] 2-phenyl phenylene was purified by extraction of the solid material with water and dichloromethane for a 68.6% yield. It is suspected that the isopropyl alcohol partially solubilizes the product and yield was lost in the filtration of the precipitated material. NMR was used to confirm the structure and purity of the material.

EXAMPLE 19

Bis 1,4 [4-hydroxybenzoyloxy]2-methyl phenylene (29 g, 0.23 mole) of methylhydroquinone and (100 g, 0.58 mole) of anisoyl chloride were added to 50 ml of pyridine and 250 ml of dry dichloromethane. The mixture was stirred for 72 hours at room temperature under nitrogen gas until it was mostly solidified. The 1,4 bis [4-methoxybenzoyl] 2-methyl phenylene was recrystallized from isopropyl alcohol for a 95% yield. (m.p. 172–174° C.)

(90 g, 0.229 mole) of the 1,4 bis [4-methoxybenzoyl 2-methyl phenylene] was added to a solution consisting of (250 g, 1.835 mole) of aluminum chloride, (142.27 g, 2.290 mole) of ethane thiol and (486 g, 5.725 mole) of dichloromethane. After one hour the reaction was quenched with 880 ml of isopropyl alcohol. The solids were filtered and the product 1,4 bis [4-hydroxybenzoyl}2-methyl phenylene] was purified by extraction of the solid material with water and dichloromethane for an 84% yield. NMR was used to confirm the structure and purity of the material.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A method for producing platform molecules comprising:

providing a first phenylene ring consisting essentially of a first functional group at a para-position to a first halogenated carboxylic group;

providing a second phenylene ring consisting essentially of a second functional group at a para-position to a second halogenated carboxylic group;

providing a third phenylene ring comprising a desired substituent and comprising a first functionality at a para-position to a second functionality; and forming a mixture comprising said first phenylene rings, said second phenylene rings, and said third phenylene rings;

exposing said mixture to conditions effective to react said first halogenated carboxylic group with said first functionality to produce a first ester bond, said conditions being effective to react said second halogenated carboxylic group with said second functionality to produce a second ester bond, producing platform molecules comprising terminal groups comprising said first functional group at position para- to said first ester bond and said second functional group at a position para- to said second ester bond, said terminal groups comprising other than polymerizable groups, one or more of said terminal groups being selected from the group consisting of H—(CH$_2$)$_n$—O— groups, Cl (CH$_2$)$_n$—O— groups, Br(CH$_2$)$_n$—O— groups, I(CH$_2$)$_n$—O—, and reactive derivatives thereof, wherein n is from about 2 to about 12 and CH$_2$ independently is selected from the group consisting of CH$_2$ which is unsubstituted and CH$_2$ which is substituted by an element selected from the group consisting of oxygen, sulfur, and an ester group; provided that at least 2 carbon atoms separate said oxygen or said ester group; and, wherein, when both of said terminal groups comprise polymerizable groups, said desired substituent provides sufficient steric hindrance to achieve a nematic state at room temperature while suppressing crystallinity at room temperature.

2. The method of claim 1 further comprising producing one or more of said first phenylene ring and said second phenylene ring by a method comprising:

reacting nitrobenzoic acid with a 1, n-dihydroxyalkane comprising an alkylene group having from about 2 to about 12 carbon atoms in the presence of an esterification catalyst under conditions effective to produce a hydroxyalkyl ester of 4 nitrobenzoic acid;

treating the hydroxyalkyl ester of 4 nitrobenzoic acid under cleaving conditions effective to produce 4-(n-hydroxyalkoxy)benzoic acid comprising a nitrobenzoic carboxyl group, wherein n is the number of carbon atoms in said alkylene group; and converting said nitrobenzoic carboxyl group to a halogenated nitrobenzoic carboxyl group; and providing said 4-(n-hydroxyalkoxy)benzoic acid comprising said halogenated nitrobenzoic carboxylic group as one or more of said first phenylene ring and said second phenylene ring, one or more of said first halogenated carboxylic group and said second halogenated carboxylic group comprising said halogenated nitrobenzoic carboxyl group.

3. The method of claim 2 wherein said converting said nitrobenzoic carboxyl group to a halogenated nitrobenzoic group comprises reacting said 4-(n-hydroxyalkoxy)benzoic acid with thionyl chloride under conditions effective to produce 4-(n-chloroalkoxy)benzoyl chloride.

4. The method of claim 2 further comprising reacting one or more of said terminal groups with a carboxyl group or a reactive derivative of a carboxyl group comprising a polymerizable group.

5. The method of claim 2 wherein said desired substituent is selected from the group consisting of alkyl groups having from about 1 to 6 carbon atoms and aryl groups.

6. The method of claim 5 wherein said first functional group and said second functional group comprise hydroxyl groups.

7. The method of claim 6 further comprising:

forming an elongation mixture comprising said platform molecules and one or more additional phenylene rings comprising additional functional groups other than polymerizable groups at para-positions to addition halogenated carboxylic group(s);and exposing said elongation mixture to conditions effective to react one or more of said additional halogenated carboxylic group(s) with one or more of said terminal groups to produce elongated platform molecules comprising additional phenylene rings comprising said additional functional group(s) at a position para- to additional ester bond(s).

8. The method of claim 1 further comprising reacting one or more of said terminal groups with a carboxyl group or a reactive derivative of a carboxyl group comprising a polymerizable group.

9. The method of claim 1 wherein said desired substituent is selected from the group consisting of alkyl groups having from about 1 to 6 carbon atoms and aryl groups.

10. The method of claim 9 wherein said first functional group and said second functional group comprise hydroxyl groups.

11. The method of claim 1 further comprising:

forming an elongation mixture comprising said platform molecules and one or more additional phenylene rings comprising additional functional groups other than polymerizable groups at para-positions to additional halogenated carboxylic group(s); and exposing said elongation mixture to conditions effective to react one or more of said additional halogenated carboxylic group(s) with one or more of said terminal groups to produce elongated platform molecules comprising additional phenylene rings comprising said additional functional group(s) at a position para- to additional ester bond(s).

12. The method of claim 1 wherein one or more of said terminal groups comprises a group or reacted derivative thereof selected from the group consisting of hydroxyl groups, amino groups, sulfhydryl groups, and halogen atoms.

13. A method for producing platform molecules comprising:

reacting 4-nitrobenzoic acid with a 1, n-dihydroxyalkane comprising an alkylene group having from about 2 to about 12 carbon atoms in the presence of an esterification catalyst under esterification conditions effective to produce a hydroxyalkyl ester of 4-nitrobenzoic acid;

treating the hydroxyalkyl ester of 4-nitrobenzoic acid under cleaving conditions effective to produce 4-(n-hydroxyalkoxy)benzoic acid, comprising a nitrobenzoic carboxyl group wherein n is the number of carbon atoms in said alkylene group;

converting said nitrobenzoic carboxyl group to a halogenated nitrobenzoic carboxyl group;

providing said 4-(n-hydroxyalkoxy)benzoic acid, comprising said halogenated nitrobenzoic carboxyl group as one or more of a phenylene ring selected from the group consisting of a first phenylene ring comprising a first halogenated carboxylic group and a second phenylene ring comprising a second halogenated carboxylic group;

providing a third phenylene ring comprising a desired substituent and comprising a first functionality at a para-position to a second functionality;

reacting said first halogenated carboxylic group with said first functionality, producing a first ester bond; and reacting said second halogenated carboxylic group with said second functionality, producing a second ester bond, thereby producing platform molecules comprising a first hydroxyalkoxy group at position para- to said first ester bond and a second hydroxyalkoxy group at a position para- to said second ester bond, wherein, when both said first hydroxyalkoxy group and said second hydroxyalkoxy group comprise polymerizable groups, said desired substituent provides sufficient steric hindrance to achieve a nematic state at room temperature while suppressing crystallinity at room temperature.

14. The method of claim 13 further comprising reacting one or more of said first hydroxyalkoxy group and said second hydroxyalkoxy group with an additional halogenated carboxyl group comprising a polymerizable group.

15. The method of claim 13 wherein said converting comprises converting 4-(n-hydroxyalkoxy)benzoic acid to 4-(n-chloroalkoxy)benzoyl chloride.

16. The method of claim 15 wherein said desired substituent is selected from the group consisting of alkyl groups having from about 1 to 6 carbon atoms and aryl groups.

17. The method of claim 15 wherein said esterification conditions comprise dissolving said 4-nitrobenzoic acid in an excess of said 1, n-dihydroxyalkane in the presence of esterification catalyst selected from the group consisting of titanium alkoxides, tin alkoxides, and sulfonic acids.

18. The method of claim 15 wherein said esterification catalyst is $Ti(OBu)_4$.

19. The method of claim 15 further comprising reacting said third phenylene ring with said 4-(n-chloroalkoxy) benzoyl chloride to produce said platform molecules.

20. The method of claim 15 further comprising stopping said reacting at intermediate times to produce desired mixtures of monofunctional and difunctional alcohol molecules.

21. The method of claim 15 wherein said cleaving conditions comprise adding alkali salts of diols and solvent to produce a displacement mixture, and exposing said displacement mixture to displacement conditions effective to displace activated nitro group, producing 4-(1-hydroxyalkyloxy)benzoic acid (1-hydroxyalkyl ester) and dimer thereof.

22. The method of claim 21 wherein said solvent is aprotic.

23. The method of claim 21 wherein said solvent is selected from the group consisting of dimethyl sulfoxide (DMSO), dimethyl formamide (DMF), dimethyl acetamide (DMAC), hexamethyl phosphonamide (HMPA), N-methyl pyrrolidinone (NMP), and combinations thereof.

24. The method of claim 21 wherein said solvent is dimethylsulfoxide (DMSO).

25. The method of claim 21 wherein said alkali salt is selected from the group consisting of NaH or $KOBu^t$.

26. The method of claim 21 further comprising
diluting said displacement mixture with an aqueous base and heating the diluted displacement mixture to cleave dimer to produce a cleaved solution comprising 4-(n-hydroxyalkoxy)benzoic acid;
acidifying said cleaved solution; and,
precipitating said 4-(n-hydroxyalkoxy)benzoic acid.

27. The method of claim 26 wherein said precipitating produces a supernatant comprising sodium chloride and nitrite, said method further comprising recovering said sodium chloride and nitrite.

28. The method of claim 26 wherein said recovering comprises vacuum evaporating solvent selected from the group consisting of DMSO, hexanediol, water, and combinations thereof.

29. The method of claim 28 wherein said converting comprises converting said 4-(n-hydroxyalkoxy)benzoic acid to 4-(n-chloroalkoxy)benzoyl chloride.

30. The method of claim 26 further comprising reacting said third phenylene ring with said 4-(n-chloroalkoxy) benzoyl chloride under reacting conditions effective to produce said platform molecules.

31. The method of claim 30 wherein said reacting conditions mixing said 4-(n-chloroalkoxy)benzoyl chloride and said third phenylene ring with pyridine to produce a reaction mixture.

32. The method of claim 31 further comprising crystallizing bis 1,4 [4"-(n-chloroalkoxy)benzoyloxy]t-butyl phenylene from said reaction mixture.

33. The method of claim 32 further comprising hydrolyzing said bis 1,4 [4"-(n-chloroalkoxy)benzoyloxy]t-butyl phenylene and recovering said platform molecule.

34. The method of claim 33 wherein said hydrolyzing comprises heating a solution of said bis 1,4 [4"-(n-chloroalkoxy)benzoyloxy]t-butyl phenylene in aprotic solvent in the presence of water and potassium bromide, producing a platform molecule solution.

35. The method of claim 34 further comprising recrystallizing said platform molecules from said platform molecule solution.

36. The method of claim 35 further comprising exchanging said 4-(n-chloroalkoxy)benzoyl chloride with iodine before reacting said 4-(n-chloroalkoxy)benzoyl chloride with said third phenylene rings.

37. The method of claim 21 wherein said reacting conditions comprise mixing said 4-(n-chloroalkoxy)benzoyl chloride and said third phenylene ring with pyridine to produce a reaction mixture.

38. The method of claim 37 further comprising crystallizing bis 1,4 [4"-(n-chloroalkoxy)benzoyloxy]t-butyl phenylene from said reaction mixture.

39. The method of claim 38 further comprising hydrolyzing said bis 1,4 [4"-(n-chloroalkoxy)benzoyloxy]t-butyl phenylene and recovering said platform molecule.

40. The method of claim 39 wherein said hydrolyzing comprises heating a solution of said bis 1,4 [4"-(n-chloroalkoxy)benzoyloxy]t-butyl phenylene in aprotic solvent in the presence of water and potassium bromide, producing a platform molecule solution.

41. The method of claim 40 further comprising recrystallizing said platform molecules from said platform molecule solution.

42. The method of claim 41 further comprising exchanging said 4-(n-chloroalkoxy)benzoyl chloride with iodine before reacting said 4-(n-chloroalkoxy)benzoyl chloride with said third phenylene rings.

43. A method for producing platform molecules comprising:
providing a first phenylene ring comprising a first functional group at a para-position to a first halogenated carboxylic group;
providing a second phenylene ring comprising a second functional group at a para-position to a second halogenated carboxylic group;
providing a third phenylene ring comprising a desired substituent and comprising a first functionality at a para-position to a second functionality; and
reacting said first functionality with said first halogenated carboxylic group, producing a first ester bond between said third phenylene ring and said first phenylene ring; and
reacting said second functionality with said second halogenated carboxylic group, producing a second ester bond, producing platform molecules comprising said first functional group at position para- to said first ester bond and said second functional group at a position para- to said second ester bond; and
forming an elongation mixture comprising one or more additional phenylene rings comprising additional functional groups other than polymerizable groups at para-position(s) to additional carboxylic group(s) selected from the group consisting of carboxyl groups and reactive derivatives of carboxyl groups; and exposing said elongation mixture to conditions effective to react said additional halogenated carboxylic group(s) with one or more functional group selected from the group consisting of said second functional group and said third functional group to produce elongated platform molecules comprising additional phenylene rings comprising said additional functional group(s) at a position para- to additional ester bond(s), said elongated platform molecules comprising terminal groups other than polymerizable groups, one or more of said terminal groups being selected from the group consisting of H—$(CH_2)_n$—O— groups, Cl$(CH_2)_n$—O— groups, Br$(CH_2)_n$—O— groups, I$(CH_2)_n$—O—, and reactive derivatives thereof, wherein n is from about 2 to about 12 and $CH_2$ independently is selected from the group consisting of $CH_2$ which is unsubstituted and $CH_2$ which is substituted by an element selected from the group consisting of oxygen, sulfur, and an ester group; provided that at least 2 carbon atoms separate said oxygen or said ester group;

wherein, when both said first functional group and said second functional group comprise polymerizable groups, said desired substituent provides sufficient steric hindrance for said platform molecules to achieve a nematic state at room temperature while suppressing crystallinity at room temperature.

44. The method of claim 43 further comprising producing one or more phenylene ring selected from the group consisting of said first phenylene ring, said second phenylene ring, and said one or more additional phenylene ring(s) by a method comprising:

reacting nitrobenzoic acid with a 1, n-dihydroxyalkane comprising an alkylene group having from about 2 to about 12 carbon atoms in the presence of an esterification catalyst under conditions effective to produce a hydroxyalkyl ester of 4 nitrobenzoic acid;

treating the hydroxyalkyl ester of 4 nitrobenzoic acid under cleaving conditions effective to produce 4-(n-hydroxyalkoxy)benzoic acid comprising a nitrobenzoic carboxyl group, wherein n is the number of carbon atoms in said alkylene group; and converting said nitrobenzoic carboxyl group to a halogenated nitrobenzoic carboxyl group; and providing said 4-(n-hydroxyalkoxy)benzoic acid as one or more of said first phenylene ring comprising said first halogenated carboxylic group, said second phenylene ring comprising said second halogenated carboxylic group, and said additional phenylene ring(s) said additional halogenated carboxylic group(s).

45. The method of claim 44 wherein said converting comprises converting said 4-(n-hydroxyalkoxy)benzoic acid to 4-(n-chloroalkoxy)benzoyl chloride.

46. The method of claim 45 further comprising reacting both said first functional group and said third functional group with a halogenated carboxyl group comprising a polymerizable group.

47. The method of claim 46 wherein said desired substituent is selected from the group consisting of alkyl groups having from about 1 to 6 carbon atoms and aryl groups.

48. The method of claim 43 further comprising reacting both said first functional group and said third functional group with a halogenated carboxyl group comprising a polymerizable group.

49. The method of claim 43 wherein said desired substituent is selected from the group consisting of alkyl groups having from about 1 to 6 carbon atoms and aryl groups.

50. The method of claim 43 wherein said first functional group and said second functional group comprise hydroxyl groups.

51. The method of claim 43 wherein one or more of said terminal groups comprises a group or reacted derivative thereof selected from the group consisting of amino groups, sulfhydryl groups, and halogen atoms.

* * * * *

UNITED STATES PATENT AND TRADEMARK OFFICE
CERTIFICATE OF CORRECTION

| | | |
|---|---|---|
| PATENT NO. | : 7,041,234 B2 | |
| APPLICATION NO. | : 10/057548 | |
| DATED | : May 9, 2006 | |
| INVENTOR(S) | : Wellinghoff, Stephen T. and Hanson, Douglas P. | |

It is certified that error appears in the above-identified patent and that said Letters Patent is hereby corrected as shown below:

Column 1, delete lines 11-12, and insert -- This invention was made with government support under NIDCR 1 P01 DE11688 awarded by the National Instisitute of Health (NIH). The government has certain rights in the invention. --.

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,041,234 B2  Page 1 of 1
APPLICATION NO. : 10/057548
DATED : May 9, 2006
INVENTOR(S) : Wellinghoff et al.

It is certified that error appears in the above-identified patent and that said Letters Patent is hereby corrected as shown below:

On the Title page, in field (56), under "U.S. Patent Documents", in column 1, line 11, delete "5,871,865 A  2/1999 Barker et al." and insert -- 5,871,665 A  2/1999 Coates et al. --, therefor.

On the Title page, in field (56), under "U.S. Patent Documents", in column 2, line 4, after "6,699,405" delete "B1" and insert -- B2 --, therefor.

On the Title page, in field (56), under "U.S. Patent Documents", in column 2, line 10, delete "Wellinhoff" and insert -- Wellinghoff --, therefor.

On the Title page, in field (57), under "Abstract", in column 2, line 5, delete "funcitonality;" and insert -- functionality; --, therefor.

In column 31, line 63, in Claim 7, delete "addition" and insert -- additional --, therefor.

In column 31, line 64, in Claim 7, delete ";and" and insert -- ; and --, therefor.

In column 32, line 42, in Claim 13, delete "acid," and insert -- acid --, therefor.

In column 32, line 43, in Claim 13, after "group" insert -- , --.

In column 32, line 47, in Claim 13, delete "acid," and insert -- acid --, therefor.

In column 36, line 13, in Claim 44, after "ring(s)" insert -- comprising --.

Signed and Sealed this

Second Day of September, 2008

JON W. DUDAS
*Director of the United States Patent and Trademark Office*